United States Patent
Liu et al.

(10) Patent No.: US 8,012,571 B2
(45) Date of Patent: Sep. 6, 2011

(54) OPTICAL FILM COMPRISING BIREFRINGENT NAPHTHALATE COPOLYESTER HAVING BRANCHED OR CYCLIC C4-C10 ALKYL UNITS

(75) Inventors: Yufeng Liu, Woodbury, MN (US);
David T. Yust, Woodbury, MN (US);
Stephen A. Johnson, Woodbury, MN (US); Kristopher J. Derks, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 655 days.

(21) Appl. No.: 12/114,109

(22) Filed: May 2, 2008

(65) Prior Publication Data
US 2009/0273836 A1    Nov. 5, 2009

(51) Int. Cl.
*B32B 7/00* (2006.01)
*B32B 7/02* (2006.01)
*B32B 27/08* (2006.01)
*B32B 27/30* (2006.01)

(52) U.S. Cl. ........ 428/212; 428/480; 528/293; 528/295; 528/302; 528/305; 528/307; 528/308; 528/308.6; 528/308.7; 359/487; 359/488; 359/494; 359/586; 359/838

(58) Field of Classification Search .................. None
See application file for complete search history.

(56) References Cited

U.S. PATENT DOCUMENTS

| | | | |
|---|---|---|---|
| 4,313,903 A | 2/1982 | Bier | |
| 4,489,110 A | 12/1984 | Bier | |
| 4,535,124 A | 8/1985 | Binsack | |
| 5,039,760 A | 8/1991 | Nakane et al. | |
| 5,837,800 A | 11/1998 | Suzuki et al. | |
| 5,882,774 A * | 3/1999 | Jonza et al. | 428/212 |
| 6,352,761 B1 * | 3/2002 | Hebrink et al. | 428/212 |
| 6,449,093 B2 * | 9/2002 | Hebrink et al. | 359/497 |
| 6,500,506 B1 | 12/2002 | Suzuki et al. | |
| 6,531,230 B1 * | 3/2003 | Weber et al. | 428/480 |
| 6,574,045 B2 | 6/2003 | Hebrink et al. | |
| 6,590,044 B2 | 7/2003 | Suzuki et al. | |
| 6,635,337 B2 * | 10/2003 | Jonza et al. | 428/212 |
| 6,641,900 B2 * | 11/2003 | Hebrink et al. | 428/212 |
| 6,788,463 B2 * | 9/2004 | Merrill et al. | 359/494 |
| 6,830,713 B2 * | 12/2004 | Hebrink et al. | 264/1.6 |
| 6,946,188 B2 * | 9/2005 | Hebrink et al. | 428/212 |
| 6,991,695 B2 * | 1/2006 | Tait et al. | 156/248 |
| 7,052,762 B2 | 5/2006 | Hebrink et al. | |
| 7,150,907 B2 | 12/2006 | Hebrink et al. | |

(Continued)

FOREIGN PATENT DOCUMENTS

| | | |
|---|---|---|
| EP | 0735952 | 10/1996 |
| JP | 3-200830 | 9/1991 |
| JP | 05-245994 | * 9/1993 |
| WO | WO 90/03993 | 4/1990 |
| WO | WO 95/17303 | 6/1995 |
| WO | WO 2007/075264 | * 5/2005 |
| WO | WO 2006/044075 | 4/2006 |

*Primary Examiner* — Vivian Chen
(74) *Attorney, Agent, or Firm* — Carolyn A. Fischer

(57) ABSTRACT

The present invention relates to multilayer optical films and birefringent copolyester films. The birefringent copolyester optical layer or birefringent copolyester film comprises a major amount of naphthalate units, ethylene units, and a minor amount of branched or cyclic C4 to C10 alkyl units. Also described are certain copolyester polymeric materials further comprising subunits of a phthalate ionomer such as dimethyl sulfosodium isophthtalate ionomer.

21 Claims, 6 Drawing Sheets

U.S. PATENT DOCUMENTS

| | | | |
|---|---|---|---|
| 7,271,951 B2 * | 9/2007 | Weber et al. | 359/359 |
| 7,459,204 B2 * | 12/2008 | Hebrink et al. | 428/212 |
| 2001/0011779 A1 * | 8/2001 | Stover | 264/1.7 |
| 2003/0072931 A1 * | 4/2003 | Hebrink et al. | 428/212 |
| 2005/0286001 A1 * | 12/2005 | Elman et al. | 349/119 |
| 2006/0084780 A1 * | 4/2006 | Hebrink et al. | 528/272 |
| 2007/0087132 A1 * | 4/2007 | Greener et al. | 428/1.1 |
| 2007/0177272 A1 | 8/2007 | Benson et al. | |
| 2007/0298271 A1 | 12/2007 | Liu et al. | |
| 2008/0020186 A1 * | 1/2008 | Hebrink et al. | 428/167 |

* cited by examiner

OPTICAL FILM COMPRISING BIREFRINGENT NAPHTHALATE COPOLYESTER HAVING BRANCHED OR CYCLIC C4-C10 ALKYL UNITS

BACKGROUND

Polymeric films are used in a wide variety of applications. Multilayer polymeric optical films are widely used for various purposes, including as mirrors and polarizers. These films often have extremely high reflectivity, while being lightweight and resistant to breakage. Examples of a wide variety of multilayer films are included in the commonly assigned U.S. Pat. No. 5,882,774, entitled "Optical Film," which is hereby incorporated by reference. Exemplary applications include compact electronic displays, including liquid crystal displays (LCDs) placed in mobile telephones, personal data assistants, computers, televisions and other devices.

One type of polymer that is useful in creating polarizer or mirror films is a polyester. One example of a polyester-based polarizer includes a stack of polyester layers of differing composition such as described for example in U.S. Pat. No. 6,641,900 (Hebrink et al.). Such stacks are also commonly referred to as a multilayer reflective film. The multilayer reflective films may also include one or more additional layers which, for example, cover at least one surface of the stack of layers to prevent damage to the stack during or after processing.

A polyester is prepared by reactions of one or more different carboxylate monomers (e.g., compounds with two or more carboxylic acid or ester functional groups) with one or more different glycol monomers (e.g., compounds with two or more hydroxy functional groups). One example of a polyester useful in multilayer optical films is polyethylene naphthalate (PEN) which can be made, for example, by reactions of naphthalene dicarboxylic acid with ethylene glycol. The properties of a polyester polymer or film vary with the particular choice of kind and amount of monomer molecules.

SUMMARY

In one embodiment, a multilayer optical film is described comprising: at least one first birefringent optical layer comprising a copolyester comprising 40 to 50 mol % naphthalate units, 35 to 49 mol % ethylene units, and 1 to 8 mol % of branched or cyclic C4-C10 alkyl units; and at least one second optical layer having a lower birefringence than the first optical layer.

In another embodiment a birefringent copolyester film is described comprising: 40 to 50 mol % naphthalate units, 35 to 49 mol % ethylene units, and 1 to 8 mol % of branched or cyclic C4-C10 alkyl units; wherein the copolyester film has an in-plane birefringence of at least 0.10 at 632.8 nm.

In yet another embodiment a copolyester polymeric material comprising 40 to 50 mol % naphthalate units, 35 to 48.95 mol % ethylene units, and 1 to 8 mol % of branched or cyclic C4-C10 alkyl units, and 0.05 to 1 mol % of units of dimethyl sulfosodium isophthalate ionomer.

In each of these embodiments, the copolyester may comprise 2 to 4 mol % of branched C4-C10 alkyl units, such as derived from neopentyl glycol. The copolyester preferably comprises 2 to 8 mol % of cyclic C4-C10 alkyl units, such as derived from cyclohexane dimethanol. The copolyester may optionally further comprise up to 8 mol % of terephthalate units. In some embodiments, the copolyester comprises carboxylate subunits and glycol subunits and 80-100 mol % of the carboxylate units comprise the naphthalate subunits; 70 to 98 mol % of the glycol subunits are derived from ethylene glycol; and 2-16 mol % of the glycol subunits are derived from one or more branched or cyclic C4-C10 alkyl glycols.

Further, in each of these embodiments, the copolyester preferably has a melting temperature ranging from 225° C. to 260° C. Preferred copolyester polymeric materials as described herein can exhibit a second scan heat of fusion of less than 2 J/g according to differential scanning calorimetry when heated at a rate of 20° C. minutes. Preferred copolyester polymeric materials are thermally stable such that the copolyester exhibits a change in viscosity of less than 15% after 1 hour under nitrogen as measured at a shear rate of $100s^{-1}$ at a temperature above the melt temperature of the copolyester.

In some embodiments, the birefringent layer of the multilayer optical or the birefrigent (e.g. monolithic) film has a relatively high in-plane birefringence, such as useful for a polarizer. In other embodiments, the birefringent layer of the multilayer optical film or the birefrigent film has a relatively high out-of-plane birefringence, such as useful for a mirror. In some embodiments, the birefringent layer or birefringent film has a relatively high in-plane and out-of-plane birefringence.

In another embodiment, a multilayer film is described comprising at least one first optical layer having a ratio of birefringence to off-axis index mismatch as defined by $(n_{x1}-n_{y1})/(n_{y1}-n_{z1})$ of at least 2.5, wherein the first optical layer comprises a copolyester that exhibits a second scan heat of fusion of less than 2 J/g according to differential scanning calorimetry when heated at a rate of 20° C. minutes; and at least one second optical layer having a lower birefringence than the first optical layer.

In yet another embodiment, a multilayer film is described comprising at least one first optical layer having a ratio of birefringence to off-axis index mismatch as defined by $(n_{x1}-n_{y1})/(n_{y1}-n_{z1})$ of at least 2.5, wherein the first optical layer comprises a copolyester having a melting temperature ranging from 225° C. to 260° C.; and at least one second optical layer having a lower birefringence than the first optical layer.

DETAILED DESCRIPTION

Figure 1:
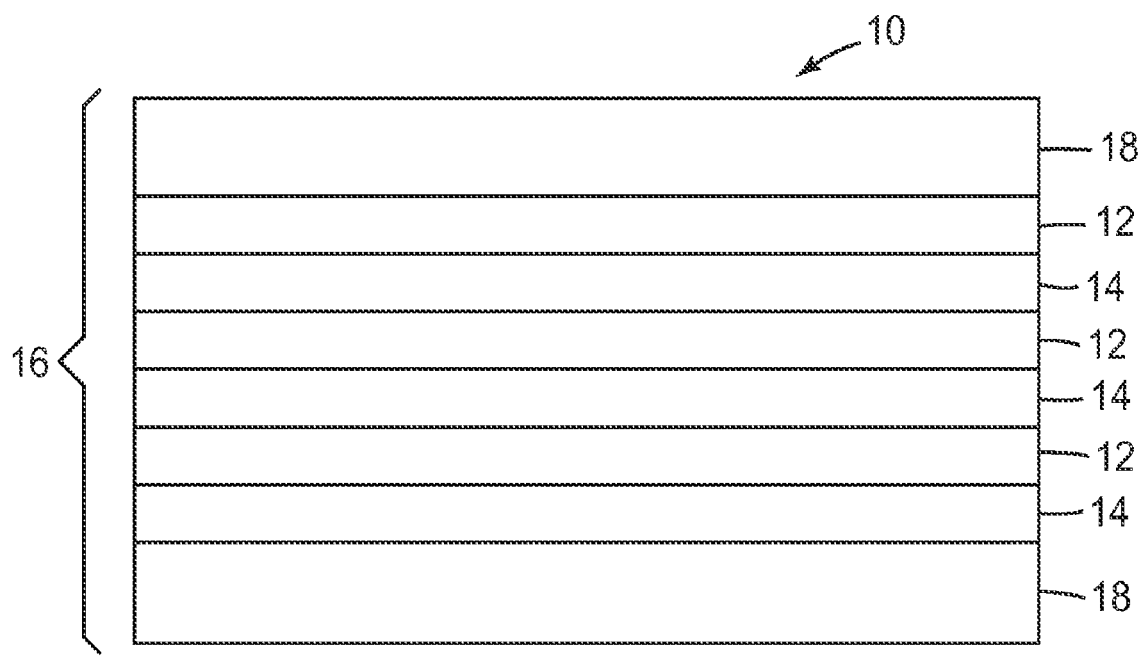
FIG. 1 is a cross sectional view of one embodiment of a multilayer optical film.
Figure 2:
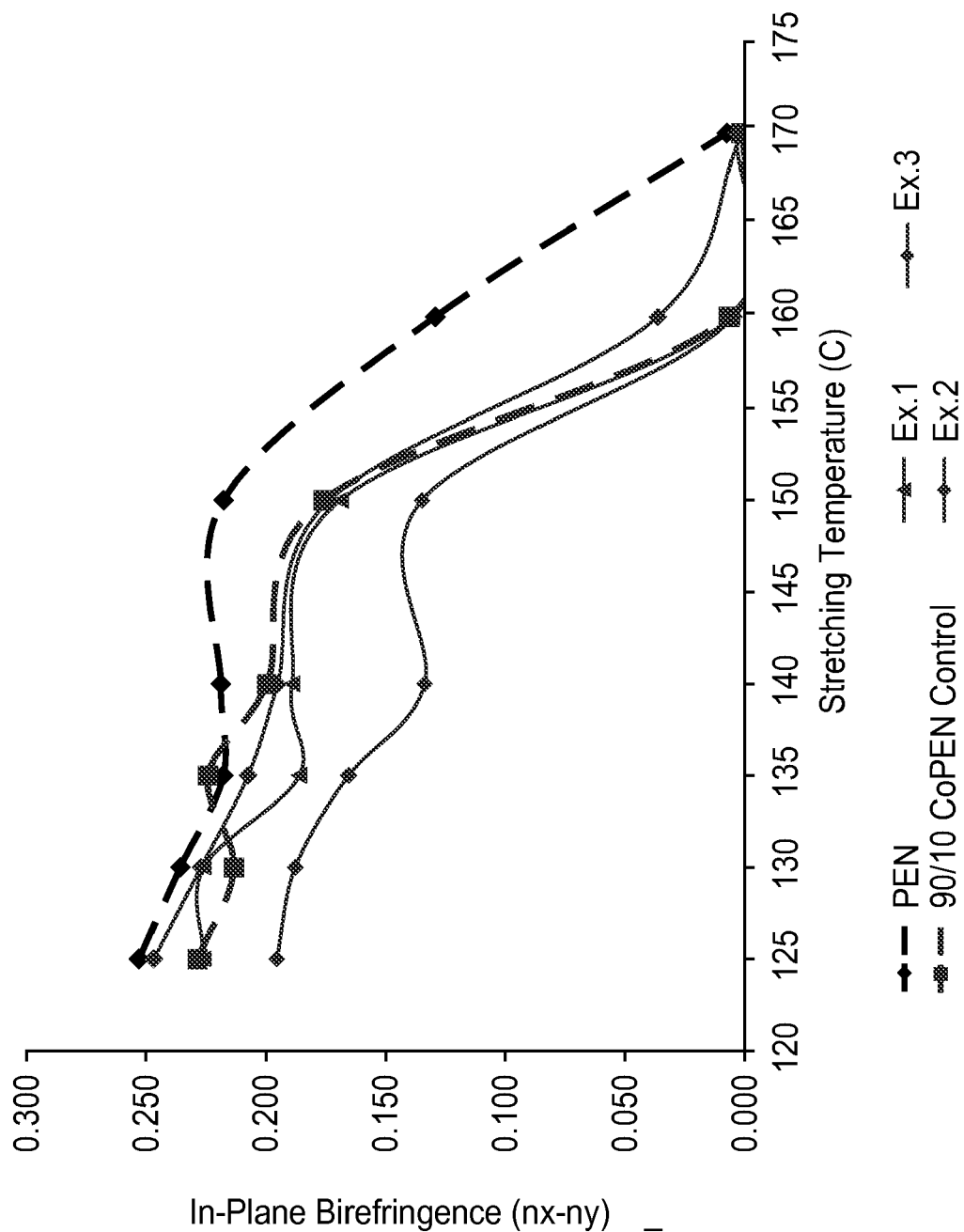
FIGS. 2-5 depict the in-plane birefringence of copolyester optical film embodiments at various stretching temperatures as processed according to Table 6.
Figure 3:
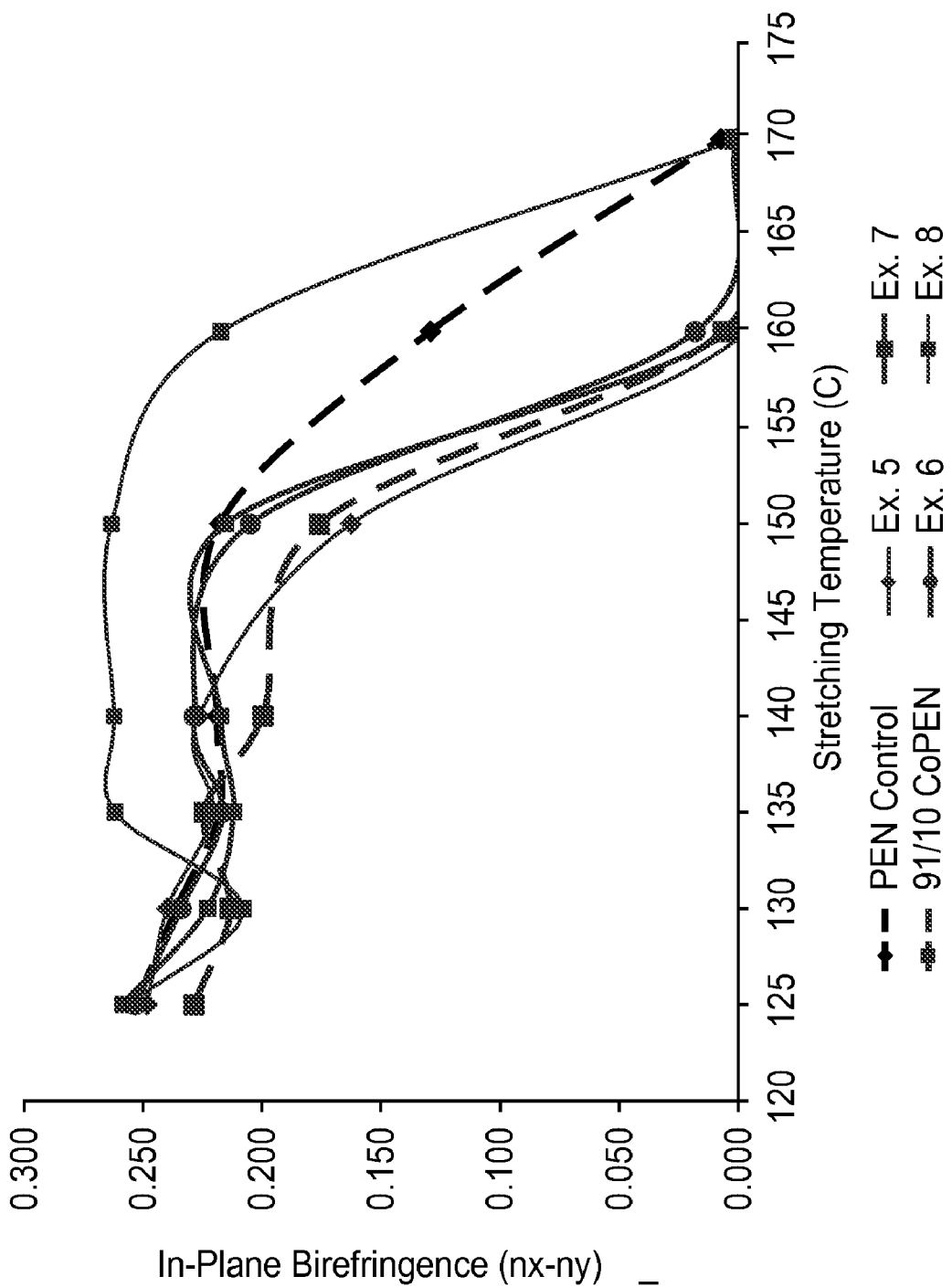
Figure 4:
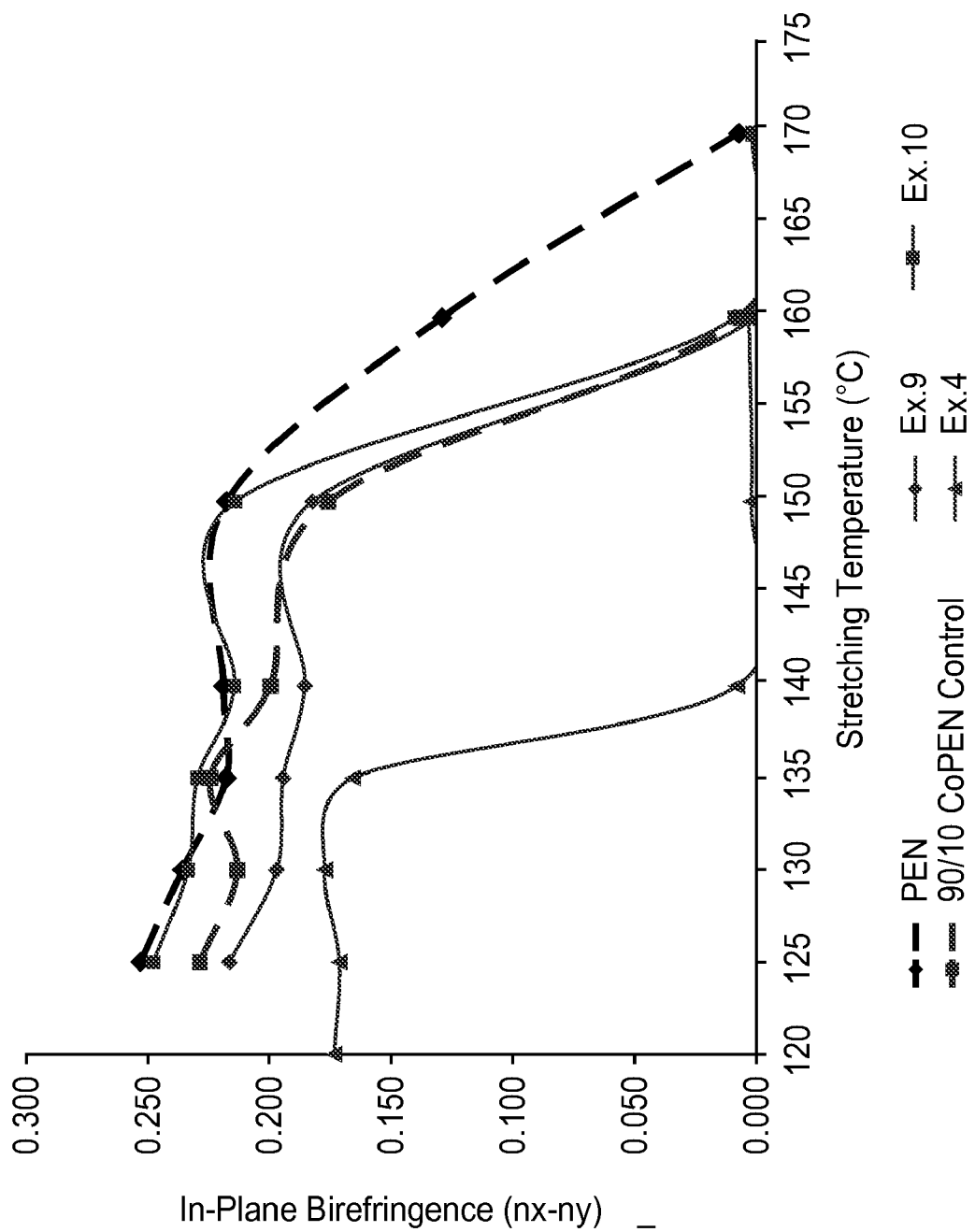
Figure 5:
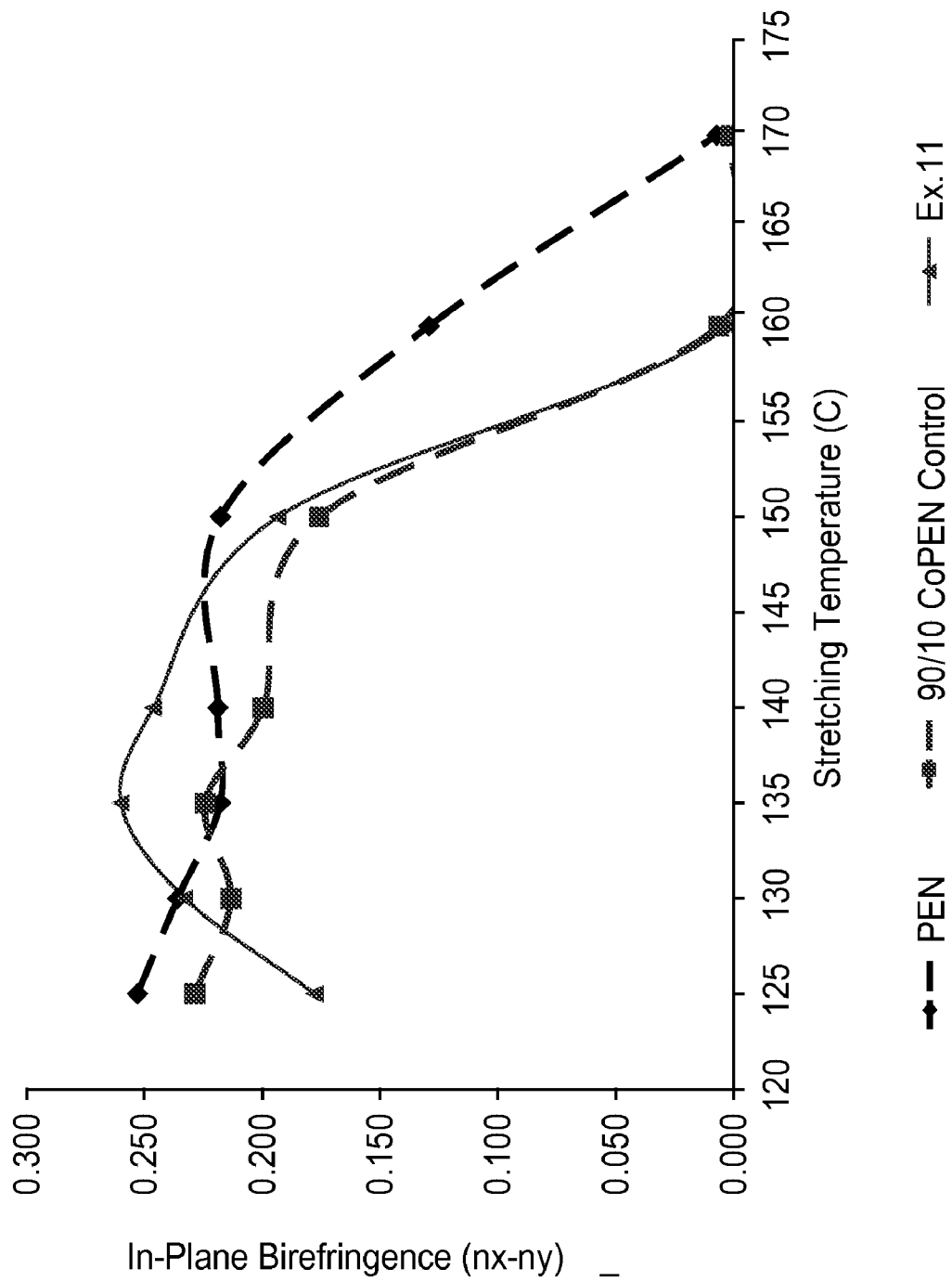

The present invention relates to multilayer optical films and birefringent copolyester films. The birefringent copolyester optical layer or birefringent copolyester film comprises a major amount of naphthalate units, ethylene units, and a minor amount of branched or cyclic C4 to C10 alkyl units. Also described are certain copolyester polymeric materials further comprising units of a phthalate ionomer such as dimethyl sulfosodium isophthtalate ionomer.

Multilayer film embodiments include a film having two or more layers. Multilayer optical films are useful, for example, as highly efficient mirrors and/or polarizers. Multilayer optical films as used in conjunction with the present disclosure exhibit relatively low absorption of incident light, as well as high reflectivity for off-axis as well as normal light rays.

As used in this application:

"index of refraction" refers to a refractive index of a material in the plane of the material with respect to light at 633 nm and normal incidence, unless otherwise indicated;

"birefringent" means that the indices of refraction in orthogonal x, y, and z directions are not all the same. For the polymer layers described herein, the axes are selected so that x and y axes are in the plane of the layer and the z axis is normal to the plane of the layer and typically corresponds to the thickness or height of the layer. Where a refractive index in one in-plane direction is larger than a refractive index in another in-plane direction, the x-axis is generally chosen to be the in-plane direction with the largest index of refraction, which sometimes corresponds to one of the directions in which the optical film is oriented (e.g., stretched). Birefringence values are reported with respect to light at 633 nm and normal incidence, unless otherwise indicated;

"high refractive index" and "low refractive index" are relative terms; when two layers are compared in at least one direction of interest, the layer that has a greater in-plane refractive index is the high refractive index layer, and the layer that has a lower in-plane refractive index is the low refractive index layer;

"polymer" means, unless otherwise indicated, polymers and copolymers (i.e., polymers formed from two or more monomers or comonomers, including terpolymers, for example), as well as copolymers or polymers that can be formed in a miscible blend by, for example, coextrusion or reaction, including transesterification, for example. Block, random, graft, and alternating polymers are included, unless indicated otherwise;

"constrained uniaxial stretching" refers to a film stretching process in which external stress is applied to introduce dimensional change in primarily two directions, in-plane stretching direction (i.e. x) and normal to in-plane (i.e. y). Specifically, it refers to a dimensional elongation in the in-plane stretching direction while substantially maintaining the film width in the in-plane non-stretching direction. As a result, the film thickness reduction usually scales with the film draw ratio and the structure is largely planar; and "unconstrained uniaxial stretching" refers to a film stretching process in which external stress is applied to introduce dimensional change in all three directions. The width of the film is usually small compare to the length of the stretching direction. Specifically, it refers to a dimensional elongation in the in-plane stretching direction while allowing both the film thickness and the film width to reduce. As a result, the film thickness reduction is less than constrained uniaxial stretched film at the same draw ratio. Furthermore, the structure of the film is more cylindrical and fiber like.

FIG. 1 shows a multilayer polymer film 10 which may be used, for example, as an optical polarizer or mirror. The film 10 includes one or more first optical layers 12, one or more second optical layers 14, and optionally one or more (e.g. non-optical) additional layers 18. FIG. 1 includes a multilayer stack having alternating layers 12, 14 of at least two materials. In one embodiment, the materials of layers 12 and 14 are polymeric. In general, U.S. Pat. No. 6,827,886, entitled "Method for making multilayer optical films," hereby incorporated by reference, describes methods that can be adapted for making multilayer film 10. In addition, although film 10 and layers 12, 14 are illustrated as having planar surfaces, at least one surface of the film 10 or layers 12, 14 or an additional layer may be structured.

An in-plane index of refraction n1 of high refractive index layer 12 is higher than an in-plane index of refraction n2 of low refractive index layer 14. The difference in refractive index at each boundary between layers 12, 14 causes part of light ray to be reflected. The transmission and reflection characteristics of multilayer film 10 is based on coherent interference of light caused by the refractive index difference between layers 12, 14 and the thicknesses of layers 12, 14. When the effective indices of refraction (or in-plane indices of refraction for normal incidence) differ between layers 12, 14, the interface between adjacent layers 12, 14 forms reflecting surface. The reflective power of interface surface depends on the square of the difference between the effective indices of refraction of the layers 12, 14 (e.g., $(n1-n2)^2$). By increasing the difference in the indices of refraction between the layers 12, 14, improved optical power (higher reflectivity), thinner films (thinner or fewer layers), and broader bandwidth performance can be achieved. Multilayer film 10 can thus be made useful as a reflective polarizer or mirror, for example. The refractive index difference in an exemplary embodiment is at least about 0.05, preferably greater than about 0.10, more preferably greater than about 0.20 and even more preferably greater than about 0.30.

In one embodiment, the materials of layers 12, 14 inherently have differing indices of refraction. In another embodiment, at least one of the materials of layers 12, 14 has the property of stress induced birefringence, such that the index of refraction (n) of the material is affected by the stretching process. By stretching multilayer film 10 over a range of uniaxial to biaxial orientations, films can be created with a range of reflectivities for differently oriented plane-polarized incident light.

In exemplary embodiments, multilayer film 10 includes tens, hundreds or thousands of layers, and each layer can be made from any of a number of different materials. The characteristics which determine the choice of materials for a particular stack depend upon the desired optical performance of multilayer film 10. Multilayer film 10 can contain as many materials as there are layers in the stack. However, for ease of illustration, exemplary embodiments of optical thin film stacks show only a few different materials.

In one embodiment, the number of layers in multilayer film 10 is selected to achieve the desired optical properties using the minimum number of layers for reasons of film thickness, flexibility and economy. In the case of reflective films such as polarizers and mirrors, the number of layers is preferably less than about 2,000, more preferably less than about 1,000, and even more preferably less than about 500.

In some embodiments, the multilayer polymer film further comprises optional additional non-optical or optical layers. The additional layers 18 are polymer layers that are disposed within the stack 16. Such additional layers may protect the optical layers 12, 14 from damage, aid in the co-extrusion processing, and/or to enhance post-processing mechanical properties. The additional layers 18 are often thicker than the optical layers 12, 14. The thickness of the additional (e.g. skin) layers 18 is usually at least two times, preferably at least four times, and more preferably at least ten times, the thickness of the individual optical layers 12, 14. The thickness of the additional layers 18 may be varied to make a multilayer polymer film 10 having a particular thickness. Typically, one or more of the additional layers 18 are placed so that at least a portion of the light to be transmitted, polarized, and/or reflected by the optical layers 12, 14, also travels through the additional layers (i.e., the additional layers are placed in the path of light which travels through or is reflected by the optical layers 12, 14).

One embodiment of multilayer film 10 comprises multiple low/high index pairs of film layers, wherein each low/high index pair of layers has a combined optical thickness of ½ the center wavelength of the band it is designed to reflect. Stacks of such films are commonly referred to as quarterwave stacks. For multilayer optical films concerned with the visible and the near infrared wavelengths, a quarterwave stack design results in each of the layers 12, 14 in the multilayer stack having an average thickness of not more than about 0.5 micrometers. In other exemplary embodiments, different low-high index pairs of layers may have different combined optical thicknesses, such as where a broadband reflective optical film is desired.

In those applications where reflective films (e.g. mirrors or polarizers) are desired, the desired average transmission for light of each polarization and plane of incidence generally depends upon the intended use of the reflective film. One way to produce a multilayer mirror film is to biaxially stretch a multilayer stack. For a high efficiency reflective film, average transmission along each stretch direction at normal incidence over the visible spectrum (about 380-750 nm) is desirably less than about 10 percent (reflectance greater than about 90 percent), preferably less than about 5 percent (reflectance greater than about 95 percent), more preferably less than about 2 percent (reflectance greater than about 98 percent), and even more preferably less than about 1 percent (reflectance greater than about 99 percent). The average transmission at about 60 degrees from the normal over the visible spectrum is desirably less than about 20 percent (reflectance greater than about 80 percent), preferably less than about 10 percent (reflectance greater than about 90 percent), more preferably less than about 5 percent (reflectance greater than about 95 percent), and even more preferably less than about 2 percent (reflectance greater than about 98 percent), and even more preferably less than about 1 percent (reflectance greater than about 99 percent). Some examples of mirror films are further described in U.S. Pat. No. 5,882,774 (Jonza et al.).

In addition, asymmetric reflective films (such as films resulting from unbalanced biaxial stretching) may be desirable for certain applications. In that case, average transmission along one stretch direction may be desirably less than, for example, about 50 percent, while the average transmission along the other stretch direction may be desirably less than, for example, about 20 percent, over a bandwidth of, for example, the visible spectrum (about 380-750 nm), or over the visible spectrum and into the near infrared (e.g., about 380-850 nm).

Multilayer optical films can also be designed to operate as reflective polarizers. One way to produce a multilayer reflective polarizer is to uniaxially stretch a multilayer stack. The resulting reflective polarizers have high reflectivity for light with its plane of polarization parallel to a first in-plane axis (usually, in the stretch direction) for a broad range of angles of incidence, and simultaneously have low reflectivity and high transmissivity for light with its plane of polarization parallel to a second in-plane axis that is orthogonal to the first in-plane axis (usually, in the non-stretch direction) for a broad range of angles of incidence. By controlling the three indices of refraction of each film, nx, ny and nz, the desired polarizer behavior can be obtained. See, for example U.S. Pat. No. 5,882,774 (Jonza et al.).

The optical layers 12, 14 and the optional additional layers 18 of the multilayer polymer film 10 are typically composed of polymers such as polyesters. Polyesters include carboxylate and glycol subunits and are generated by reactions of carboxylate monomer molecules with glycol monomer molecules. Each carboxylate monomer molecule has two or more carboxylic acid or ester functional groups and each glycol monomer molecule has two or more hydroxy functional groups. The carboxylate monomer molecules may all be the same or there may be two or more different types of molecules. The same applies to the glycol monomer molecules. The properties of a polymer layer or film vary with the particular choice of monomer molecules of the polyester.

Presently described are multilayer optical films comprising one or more birefringent copolyester layers, birefringent copolyester films, and certain copolyester polymeric materials.

The copolyester polymeric materials are described herein with reference to the overall composition i.e. 100 mol % units derived from 50 mol % carboxylate units and 50 mol % glycol units. Copolyester polymeric materials are also described herein with reference to the mol % of carboxylate subunits and mol % glycol subunits (i.e. 100 mol % of carboxylate subunits are reacted with 100 mol % of glycol subunits in the preparation of the copolyester).

The copolyester is generally made by reactions of naphthalene dicarboxylic acid with ethylene glycol and at least one additional (e.g. glycol) comonomer that contributes branched or cyclic C4-C10 alkyl units.

Suitable carboxylate monomer molecules for use in forming the carboxylate subunits of the polyester layers include, for example, naphthalene dicarboxylic acid such as 2,6-naphthalene dicarboxylic acid monomer and isomers thereof. The 2,6-naphthalene dicarboxylic acid monomer and/or isomers thereof is employed at a concentration such that 80 to 100 mol % of the carboxylate subunits (or 40 to 50 mol % of the copolyester) comprise naphthalate subunits. Preferably, at least 81, 82, 83, 84, or 85 mol % of the carboxylate subunits comprise naphthalate subunits.

In some embodiments, the copolyester is formed from 2,6-naphthalene dicarboxylic acid or isomers thereof in combination with one or more other (i.e. different than naphthalene dicarboxylic acid monomer and isomers thereof) carboxylate monomer molecules. For embodiments wherein the copolyester contains more than one type of carboxylate subunit, the copolyester may be a block or random copolyester. The total amount of other carboxylate monomer(s) may range up to 20 mol % (or up to 10 mol % of the copolyester). Typically, the total amount of other carboxylate monomers is no greater than 19, 18, 17, 16, or 15 mol % (or no greater than 9.5, 9, 8.5, 8, or 7.5 mol % of the copolyester)

Suitable other carboxylate monomers include for example terephthalic acid; isophthalic acid; phthalic acid; azelaic acid; adipic acid; sebacic acid; norbornene dicarboxylic acid; bicyclooctane dicarboxylic acid; t-butyl isophthalic acid, trimellitic acid, sodium sulfonated isophthalic acid; 4,4'-biphenyl dicarboxylic acid and isomers thereof, and lower alkyl esters of these acids, such as methyl or ethyl esters. The term "lower alkyl" refers, in this context, to C1-C10, preferably C1-C4, and more preferably C1-C2 straight-chained or branched alkyl groups.

In some embodiments, the copolyester comprises carboxylate subunits derived from terephthalic acid such as dimethyl terephthalic acid (DMT). The copolyester can exhibit better adhesion to second optical layers made from a copolyester that contains terephthalate due to the presence of common monomer units. In this embodiment, at least 1, 2, 3, 4, or 5 mol % and typically no greater than 15 mol % of the total carboxylate subunits are derived from terephthalic acid. Hence, in this embodiment, the copolyester comprises 0.5, 1.0, 1.5, 2.0, or 2.5 mol % and typically no greater than 7.5 mol % of terephthalate units. In some embodiments, the amount of carboxylate subunits derived from terephthalic acid such as dimethyl terephthalic acid is less than 14, 13, or 12 mol %. Thus, the copolyester comprises less than 7.0, 6.5, or 6.0 mol % of terephthalate units.

In some embodiments, the copolyester comprises an even higher concentration of naphthalate subunits contributed by naphthalene dicarboxylic acid and isomers thereof. For example the concentration of the naphthalate subunits may be at least 90, 91, 92, 93, 94, 95, 96, 97, or 98 mol %. For such embodiments, the branched or cyclic C4-C10 alkyl units are generally derived from branched or cyclic C4-C10 alkyl glycols such as neopentyl glycol, cyclohexanedimethanol, or a mixture thereof.

However, particularly for embodiments that employ lower concentrations of naphthalate units, the branched or cyclic C4-C10 alkyl units can alternatively be provided, at least in part, by suitable carboxylate monomer molecules to the extent the desired properties such as high birefringence and/or reduced thermal processing temperatures of the resulting copolyester are attainable. For example, cyclic C4-C10 alkyl units could be contributed, at least in part, by cyclohexane dicarboxylic acid and lower alkyl esters of this acid such a methyl or ethyl esters.

Suitable glycol monomer molecules for use in forming glycol subunits of the copolyester include ethylene glycol in combination with branched or cyclic C4-C10 alkyl glycols such as neopentyl glycol, cyclohexanedimethanol, and mixtures thereof. Ethylene glycol monomer is typically employed at concentrations such that 70 to 98 mol % of the glycol subunits (or 35 to 49 mol % of the copolyester) comprise ethylene subunits. Typically at least 1 or 2 mol % and no greater than 16 mol % of the glycol subunits are derived from branched and/or cyclic C4-C10 alkyl glycols. Hence, the copolyester comprises at least 0.5 to 1 mol % and no greater than 8 mole % of branched and/or cyclic C4-C10 alkyl units.

In some embodiments, the copolyester comprises glycol subunits derived from ethylene glycol and a branched C4-C10 alkyl glycol(s) such as neopentyl glycol, in the absence of a cyclic C4-C10 alkyl glycol such as cyclohexanedimethanol. In this embodiment, the copolyester typically comprises less than 5 mol % (e.g. 10 mol % of the glycol subunits) of branched C4-C10 alkyl unit(s). The amount of branched C4-C10 alkyl unit(s) (e.g. neopentyl glycol) of the copolyester preferably ranges from about 2 to 4 mol % (e.g. 4 to 8 mol % of glycol subunits).

In preferred embodiments, the copolyester comprises glycol subunits derived from ethylene glycol and cyclic C4-C10 alkyl glycol(s) such as cyclohexanedimethanol, in the absence of branched C4-C10 alkyl glycol such as neopentyl glycol. In this embodiment, it is preferred that the copolyester comprises 2 to 8 mol % of cyclic C4-C10 alkyl unit(s) such as cyclohexanedimethanol units.

The copolyester may optionally be formed from one or more other glycol monomer molecules. Suitable glycol monomer molecules include for example propylene glycol; 1,4-butanediol and isomers thereof, 1,6-hexanediol; polyethylene glycol; diethylene glycol; tricyclodecanediol; and isomers thereof, norbornanediol; bicyclo-octanediol; trimethylol propane; pentaerythritol; 1,4-benzenedimethanol and isomers thereof, bisphenol A; 1,8-dihydroxy biphenyl and isomers thereof, and 1,3-bis(2-hydroxyethoxy)benzene. Typically, the amount of units derived from other glycol monomers (i.e. different than ethylene glycol and C4-C10 alkyl glycol(s) such as neopentyl glycol, or cyclohexane glycol) is no greater than 5 mol %. In some embodiments, units derived from other glycol monomers is no greater than 1 or 2 mol %. In the absence of other glycol monomers in the synthesis, copolyester polymers typically contain about 0.5 to 3 mol % of diethylene glycol as a side reaction by-product.

The copolyester for use in making the birefringent first optical layer may further comprise a small concentration of a phthalate ionomer such as sodium sulfate isophthalate (SSIP) to improve the processability. The ionic comonomer typically contains, one or more dicarboxylic moieties derived from phthalate, isophthalate, terephthalate, and/or naphthalate. The counter ion can be H+ or other metal ions such as potassium, lithium, zinc, magnesium, calcium, cobalt, iron, and/or antimony. The concentration of ionomer generally ranges from about 0.005 mol % to 2 mol %. In some embodiments, the concentration of ionomer of the copolyester is no greater than 1 mol %. In other embodiments, the concentration of ionomer of the copolyester is no greater than 0.5 mol %.

In preferred embodiments, the copolyester described herein has birefringence properties comparable to PEN. In preferred embodiments, the copolyester described herein has a higher birefringence than lower melting birefringent copolyester, referred to herein as "90/10 coPEN". 90/10 coPEN differs from PEN in that about 10% of the carboxylate units are terephthalate subunits.

As previously discussed in-plane birefringence properties are important for many types of multilayer optical films such as multilayer optical films utilized as a polarizer. As depicted in FIG. 2-5 the high refractive index layers 12 prepared from the birefringent copolyester described herein have an in-plane birefringence (the absolute value of nx−ny) after orientation of 0.05 or greater at 632.8 nm. Preferably the in-plane birefringence is about 0.10 or greater. The refractive index of the copolyester for 632.8 nm light polarized in a plane parallel to the stretch direction can increase from about 1.62 to as high as about 1.87. Within the visible spectrum, copolyester exhibits a birefringence of 0.20 to 0.40 over a wavelength range of 400-700 nm for a typical high orientation stretch (e.g., a material stretched to five or more times its original dimension at a temperature of 100 to 150° C. and an initial strain rate of 5 to 150%/sec).

Another way to express birefringence is with respect to the average in-plane birefringence (constrained uniaxial or unconstrained uniaxial) after the film is formed, i.e. stretched near the glass transition temperature at a temperature range from 125 to 150° C. range. The second scan glass transition temperature (Tg) of the birefringent copolyester is as determined by Differential Scanning Calorimetry (DSC) according to the test method described in the examples is typically at least 105° C. and generally no greater than about 125° C.

As depicted in Tables 6 and 7, the optical layer formed from the copolyester described herein can exhibit an average in-plane (e.g. constrained) uniaxial birefringence of at least 0.10, 0.15, or 0.20. In some embodiments, the average in-plane constrained uniaxial birefringence is at least 0.21 or at least 0.22. Further, the average in-plane unconstrained uniaxial birefringence can be at least 0.25, 0.30, 0.31, or 0.31.

For other types of multilayer optical films, such as those utilized as a mirror film, the out-of-plane birefringence properties are of importance. As depicted in Table 5, the optical layer formed from the copolyester described herein can exhibit an average out-of-plane birefringence of at least 0.10. In some embodiments, the average out-of-plane birefringence is at least 0.18 or at least 0.20. Further, the average out-of-plane birefringence can be at least 0.16 or 0.17.

The spectral characteristics of a multilayered optical film, such as a reflective polarizer can be measured and used to estimate the effective refractive indices of the birefringent ($n_{x1}$, $n_{y1}$, $n_{z1}$) and second (e.g. isotropic) layers ($n_{x2}$, $n_{y2}$, $n_{z2}$). Preferred effective refractive indices of the second (e.g. isotropic) layer are typically chosen to be about equal to $n_{y1}$, $n_{z1}$ or both (with reference to a film stretched in the x direction). The refractive index components of film layers prepared from copolyesters as described herein can provide an increased $n_{x1}$, component while decreasing $n_{y1}$ and increasing $n_{z1}$ components of the refractive index in comparison to PEN. Both these characteristics are highly desirable for a reflective polarizer when used in a LCD display as the $(n_{x1}-n_{y1})$ contributes strongly towards the amount of brightness increase or efficiency of the polarizer (i.e. higher values of $(n_{x1}-n_{y1})$ are desirable) and the $(n_{y1}-n_{z1})$ is related to the tendency a multilayer reflective polarizer to have off angle reflectivity with pass state light and thus tendency for the display to have objectionable color characteristics (i.e. lower values $(n_{y1}-n_{z1})$ are desirable). This feature can be quantified using a ratio between birefringence and off-axis index mismatch as defined by the equation $(n_{x1}-n_{y1})/(n_{y1}-n_{z1})$. In preferred embodiments, the ratio between birefringence and off-axis index mismatch as defined by $(n_{x1}-n_{y1})/(n_{y1}-n_{z1})$ is at least 2.5. In more preferred embodiments, the ratio between birefringence and off-axis index mismatch as defined by $(n_{x1}-n_{y1})/(n_{y1}-n_{z1})$ is at least 2.7.

The intrinsic viscosity of the copolyester of the first and polymeric material of the second optical layers as well as optional coextrudeable additional (e.g. skin) layers is related to the molecular weight (in the absence of branching monomers) of the polymer. Typically, the polyesters have an intrinsic viscosity of greater than about 0.4 dL/g. Preferably, the intrinsic viscosity is between about 0.4 to 0.9 dL/g. Intrinsic viscosity, for purposes of this disclosure, is measured in a 60/40 wt. % phenol/o-dichlorobenzene solvent at 30° C. unless otherwise indicated.

Furthermore, the first optical layers, second optical layers, and coextrudeable additional layers are chosen to have similar rheological properties (e.g., melt viscosities). Typically, the second optical layers and coextrudeable additional layers have a glass transition temperature, Tg, that is either below or no greater than about 40° C. above the glass transition temperature of the first optical layers. Preferably, the glass transition temperature of the second optical layers and the optional additional layers is below the glass transition temperature of the first optical layers.

However, alternatively or in addition to the birefringence properties just described, the copolyester described herein has various thermal properties that are ameneable to processing the copolyester at reduced temperatures in comparison to PEN.

Figure 6:
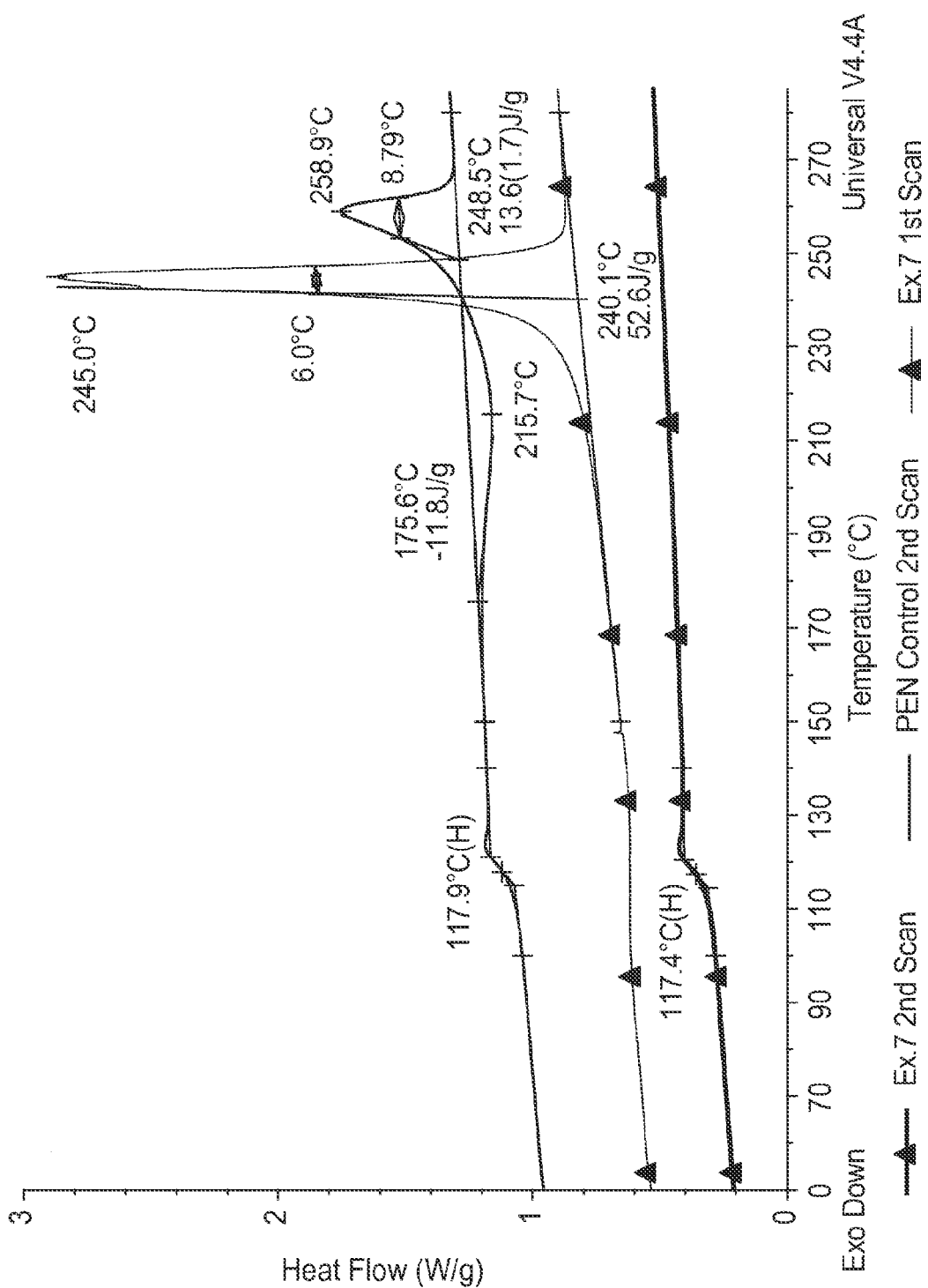
FIG. 6 depicts Differential Scanning Calorimetry properties of an exemplary copolyester polymeric material.

With reference to FIG. 6, a DSC scan of an exemplary birefringent copolyester as described herein in comparison to PEN, preferred embodiments of copolyester materials described herein do not exhibit a second scan crystallization peak and thus do not contain substanial amounts of crystallinity. Despite the absence of thermally induced crystallization, as evident by the first scan a very strong exothermic peak was observed in a highly oriented sample. This demonstrates the strain-hardening nature of the copolyester described herein that is indicative of high birefringence. Heat of fusion is one way to quantify such hindered crystallization. With reference to Table 3, the copolyester exhibits a second scan heat of fusion of less than 2 J/g according to differential scanning calorimetry when heated at a rate of 20° C. minutes, as measured according to the test method described in further detail in the examples.

With reference to Table 3, the copolyester typically has a lower melting temperature (Tm as determined by DSC) than PEN and thus less than 270° C. The melting temperature is typically at least 225° C. and preferably no greater than 260° C. In view of the thermal properties of the copolyester described herein, the copolyester can be formed into a film at reduced processing temperature. For example, the following table sets forths typical processing condition for PEN, 90/10 CoPEN, and as well as the birefringent copolyester described herein in

| Typical Processing Conditions | | | |
|---|---|---|---|
| Melt Train | PEN | 90/10 CoPEN | Birefringent Copolyester |
| Average extruder barrel temp° F. | ~570 (298° C.) | ~525 (274° C.) | ~475 (246° C.) |
| Extruder Exit melt probe, ° F. | ~600 (315° C.) | ~550 (288° C.) | ~507 (264° C.) |
| Gear Pump/Filter/Neck Tube Set Point, ° F. | ~540 (282° C.) | ~525 (274° C.) | ~480 (249° C.) |
| Melt Transport Line Set Point, ° F. and Die Set Point, ° F. | ~530 (277° C.) | ~525 (274° C.) | ~480 (249° C.) |

The copolyesters described herein are thermally stable at processing temperatures ranging from 250° C.-280° C. As shown in Table 4, copolyesters described herein may exhibit a slight melt viscosity increase. Without intending to be bound by theory, the viscosity increase is likely due to additional polymerization in the melt. Typically, the copolyester exhibits a change in viscosity of less than 15% after 1 hour at 250° C., 255° C., 260° C., 265° C., 270° C., 275° C., or 280° C. under nitrogen as measured at a shear rate of $100s^{-1}$ according to the test method further described in the examples.

The reduced processing temperature of the copolyester described herein is particularly advantageous for reducing the thermal degradation of other adjacent layers, such as the second layer(s) or skin layers of the multilayer optical film. For example, one exemplary copolyester suitable for use as the second layer of a multilayer optical film is commercially available from Eastman Chemical Company, Kingsport, Tenn., under the trade designation "SA115". At a temperature of 280° C. for a duration of 60 min, SA115 exhibits a viscosity reduction (initial viscosity–final viscosity)/initial viscosity× 100%) of 66.3%. However, this same material exhibits a viscosity reduction of 13.1% at a temperature of 250° C. Accordingly, the thermal degration of SA115 is significantly less when subjected to lower processing temperatures. Similarly, another exemplary copolyester for use as the second layer of a multilayer optical film, the copolyester commercially available from Eastman under the trade designation "PETG 6763", exhibits a viscosity reduction of 52% at 280° C., yet 6.4% at 250° C. Accordingly, the combination of the first optical layer(s) and second optical layer(s) can exhibit a change in viscosity of less than 15% as measured at a shear rate of $100s^{-1}$ after 1 hour under nitrogen at a temperature of 250° C. Since degradation is one of the major sources of film defects, improved thermal stability is amenable to reduced film defects and increasing manufacturing yields.

In addition to the advantageous birefringence and reduced processing temperature attributes described above, the copolyester described herein is also surmised to provide improved adhesion to the second isotropic optical layer (especially those isotropic layers comprising branched or cyclic C4-C10 alkyl units such as neopentyl glycol or cyclohexane dimethanol) resulting in improved delamination performance relative to PEN or 90/10 CoPEN.

In some embodiments, the second optical layers 14 are uniaxially or biaxially orientable. However, more typically the second optical layers 14 retain a relatively isotropic index of refraction, even when stretched. The second optical layers have a birefringence of less than about 0.04, and more preferably less than about 0.02 at 632.8 nm.

The second optical layers 14 may be made from a variety of polymers. Examples of suitable polymers include vinyl polymers and copolymers made from monomers such as vinyl naphthalenes, styrene, maleic anhydride, acrylates, and methacrylates. Examples of such polymers include polyacrylates, polymethacrylates, such as poly(methyl methacrylate) (PMMA), and isotactic or syndiotactic polystyrene. Other polymers include condensation polymers such as polysulfones, polyamides, polyurethanes, polyamic acids, polyimides, and polydiorganosiloxane polyamide block copolymers such as described in U.S. patent application Ser. No. 11/614, 169 filed Dec. 21, 2006. In addition, the second optical layers 14 may be formed from polymers and copolymers such as polyesters and polycarbonates. The second optical layers 14 will be exemplified below by copolymers of polyesters. However, it will be understood that the other polymers described above may also be used. The same considerations with respect to optical properties for the copolyesters, as described below, will also typically be applicable for the other polymers and copolymers.

Examples of suitable materials for the second optical layers 14 are copolymers of PEN, PBN, PET, or PBT. Typically, these copolymers include carboxylate subunits which are 20 to 100 mol % second carboxylate subunits, such as naphthalate (for coPEN or coPBN) or terephthalate (for coPET or coPBT) subunits, and 0 to 80 mol % second comonomer carboxylate subunits. The copolymers also include glycol subunits which are 40 to 100 mol % glycol subunits, such as ethylene (for coPEN or coPET) or butylene (for coPBN or coPBT), and 0 to 60 mol % second comonomer glycol subunits. At least about 20 mol % of the combined carboxylate and glycol subunits are second comonomer carboxylate or glycol subunits derived from a birefringent reducing comonomer. The comonomers may be distributed randomly in the coPEN polyester or they may form one or more blocks in a block copolymer.

Examples of suitable birefringent-reducing comonomer materials for use as carboxylate subunits are derived from t-butyl-isophthalic acid, phthalic acid, and lower alkyl esters thereof. Although birefringent copolyesters may contain up to 15 mol-% of terephthalate subunits, isotropic copolyesters typically contain at least 25, 30, 35, 40, 45 or 50 mol-% of terephthalate and/or isophthalalte subunits.

Examples of suitable birefringent-reducing comonomer materials for use as diol subunits that are typically used in combination with the birefringent-reducing carboxylate subunits are derived from 1,6-hexanediol, trimethylol propane, and branched or cyclic C4 to C10 alkyl diols. In some embodiments, the copolyester of the isotropic layer includes 2 to 46 mol %, preferably 4 to 15 mol %, of these birefringent reducing diols.

The addition of comonomer subunits derived from compounds with three or more carboxylate, ester, or hydroxy functionalities may also decrease the birefringence of the copolyester of the second layers. Suitable comonomers include for example trimethylol propane and pentaerythritol. These compounds act as branching agents to form branches or crosslinks with other polymer molecules. In some embodiments, the copolyester of the second layer includes 0.01 to 5 mol %, preferably 0.1 to 2.5 mol %, of these branching agents.

Referring again to FIG. 1, the multilayer film may optionally comprise one or more of the additional layers 18 laminated to or formed as a skin layer over at least one surface of stack 16 as illustrated in FIG. 1. Layers of the same or differing materials may be distributed within the stack, as well as on one or two of the major surfaces.

In some embodiments, the additional layers 18 typically do not significantly participate in the determination of optical properties of the multilayer polymer film 10, at least across the wavelength region of interest. The additional layers 18 are typically not birefringent or orientable. Such additional layers may protect the optical layers from damage, aid in the co-extrusion processing, and/or to enhance post-processing mechanical properties and/or provide greater mechanical strength to the stack.

Alternatively, the appearance and/or performance of multilayer film may be altered by including additional layers such as a skin layer on a major surface or an underskin layer contiguous with a skin layer within the stack of film layers.

Typically, when the additional layers 18 are used as skin layers there will be at least some surface reflection. If the multilayer polymer film 10 is to be a polarizer, the additional layers preferably have an index of refraction which is relatively low. This decreases the amount of surface reflection. If the multilayer polymer film 10 is to be a mirror, the additional layers 18 preferably have an index of refraction which is high, to increase the reflection of light.

When the additional layers 18 are found within the stack 16, there will typically be at least some polarization or reflection of light by the additional layers 18 in combination with the optical layers 12, 14 adjacent to the additional layers 18. Typically, however, the additional layers 18 have a thickness which dictates that light reflected by the additional layers 18 within the stack 16 has a wavelength outside the region of interest, for example, in the infrared region for visible light polarizers or mirrors.

The additional layers may be prepared from polyesters such as coPEN. The additional layers may also be prepared from any of the polymeric materials previously described for use as the second low refractive index layer.

Skin layers and interior layers may be integrated at the time of film formation, either by coextrusion or in a separate coating or extrusion step, or they may be applied to the finished film at a later time, such as by coating or lamination of a skin layer to a previously formed film. Total additional layer thicknesses typically range from about 2% to about 50% of the total thickness of multilayer film.

Examples of additional layers or coatings are described in U.S. Pats. No. 6,368,699, and 6,459,514 both entitled "Multilayer Polymer Film with Additional Coatings or Layers," both of which are incorporated herein by reference, and U.S. Pat. No. 6,783,349 to Neavin et al., entitled "Apparatus for Making Multilayer Optical Films," incorporated herein by reference.

The composition of additional layers may be chosen, for example, to protect the integrity of layers 12, 14 during or after processing, to add mechanical or physical properties to multilayer film 10; or to add optical functionality to multilayer film 10. Functional components such as antistatic additives, ultraviolet light absorbers (UVAs), hindered amine light stabilizers (HALS), dyes, colorants, pigments, antioxidants, slip agents, low adhesion materials, conductive materials, abrasion resistant materials, optical elements, dimensional stabilizers, adhesives, tackifiers, flame retardants, phosphorescent materials, fluorescent materials, nanoparticles, anti-graffiti agents, dew-resistant agents, load bearing agents, silicate resins, light diffusing materials, light absorptive materials and optical brighteners may be included in these layers, preferably such that they do not substantially interfere with the desired optical or other properties of the resulting product. In some exemplary embodiments, one or more additional layers may be or may include diffusers, such as a rough, matte or structured surface, a beaded diffuser or a diffuser including organic and/or inorganic particles, or any number or combination thereof.

One exemplary skin layer comprises a PMMA or polycarbonate/copolyester blend polymer (SA115) in combination with (e.g. about 2-3 wt-%) an ultraviolet light absorber such as 2-(4,6-diphenyl-1,3,5-triazin-2-yl)-5-(hexyloxy)-phenol), commercially available from Ciba under the trade designation "Tinuvin 1577"; (e.g. about 0.5 wt-%) of a hindered amine light stabilizer such as 10 wt % dimethyl succinate polymer with 4-hydroxy-2,2,6,6,-tetramethyl-1-piperidineethanol, 90 wt % N,N'''-[1,2-ethanediylbis[[[4,6-bis[butyl(1,2,2,6,6-pentamethyl-4-piperidinyl)amino]-1,3,5-traizin-2-yl]imino]-3,1-propanediyl]] bis[N'N''-dibutyl-N'N''-bis(1,2,2,6,6-pentamethyl-4-piperidinyl)]-1, commercially available from Ciba under the trade designation "Chimmasorb 119 FL", and (e.g. about 0.1 wt-%) of an antioxidant such as benzenepropanoic acid, 3,5-bis(1,1-dimethylethyl)-4-hydroxy-, 2,2-bis[[3-[3,5-bis(1,1-dimethylethyl)-4-hydroxyphenyl]-1-oxopropoxy]m, commercially available from Ciba under the trade designation "Irganox 1010 FF" or bis(2,4-di-tert-butylphenyl)pentaerythritol diphosphite, commercially available from Chemtura Corporation under the trade designation "Ultranox 626".

In one example, skin layers are used to aid in post-extrusion processing; for example, by preventing sticking of the film to hot rollers or tenter clips. In another embodiment, skin layers are added to impart desired barrier properties to multilayer film. For example, barrier films or coatings may be added as skin layers or as a component in skin layers to alter the transmissive properties of the multilayer film towards liquids, such as water or organic solvents, or gases, such as oxygen or carbon dioxide.

Skin layers may also be added to impart or improve abrasion resistance in the resulting multilayer film. For example, a skin layer comprising inorganic particles such as silica embedded in a polymer matrix may be used. In another embodiment, skin layers may comprise an abrasion resistant coating such as described in U.S. Pat. No. 5,677,050. Skin layers may also be added to impart or improve puncture and/or tear resistance in the resulting multilayer film. Puncture or tear resistant skin layers may be applied during the manufacturing process or later coated onto or laminated to multilayer film 10. Adhering these layers to multilayer film 10 during the manufacturing process, such as by a coextrusion process, provides the advantage that multilayer film 10 is protected during the manufacturing process.

In one example, additional layer(s) includes a dye or pigment that absorbs in one or more selected regions of the spectrum. Exemplary selected regions of the spectrum may include portions or all of the visible spectrum as well as ultraviolet and infrared. If all of the visible spectrum is absorbed, the layer will appear opaque. Materials for layers can be selected in order to change the apparent color of light transmitted or reflected by multilayer film. They can also be used to compliment the properties of the film, particularly where the film transmits some frequencies while reflecting others. In another embodiment, the use of a UV absorptive material in a skin cover layer is particularly desirable because it may be used to protect inner layers that may sometimes be unstable when exposed to UV radiation. In one embodiment, a fluorescent material is incorporated into the additional layer. Fluorescent materials absorb electromagnetic energy in the ultraviolet region of the spectrum and reemit in the visible.

Adhesives, including pressure sensitive adhesives, form another desirable class of materials that may be applied to a multilayer stack as a skin layer. Generally, pressure sensitive adhesives are applied when multilayer film is intended for later lamination to another material, such as a glass or metal substrate.

Another material that may be incorporated in skin layer is a slip agent. A slip agent will make multilayer film easier to handle during the manufacturing process. Typically a slip agent is used with a mirror film rather than a film intended to transmit a portion of the light striking it. The side including the slip agent is typically the side intended to be laminated to a supporting substrate in order to prevent the slip agent from increasing haze associated with the reflection.

Many of the advantages derived from skin layers can also be derived from an analogous internal layer. Thus, the foregoing discussion regarding skin layers is also applicable to internal layer(s).

Other additional layers include layers containing holographic images, holographic diffusers, or other diffusing layers. The foregoing has described examples of various layers that can be applied to a multilayer film stack to alter its properties. In general, any additional layers may be added, typically offering different mechanical, chemical, or optical properties than those of the layers 12, 14.

In the exemplary embodiment, the additional layer may be an absorbing or dichroic polarizer layer, as described, for example, in U.S. Pat. No. 6,096,375 to Ouderkirk et al., entitled "Optical Polarizer," incorporated herein by reference. In some such configurations, the transmission axis of a dichroic polarizer is aligned with the transmission axis of a reflective polarizer.

A description of the process conditions and considerations for forming multilayer polymer films is found in U.S. patent application Ser. No. 09/006,288 entitled "Process for Making Multilayer Optical Film."

The films are generally prepared by co-extruding the individual polymers to form multilayer film and then orienting film by stretching at a selected temperature, optionally followed by heat-setting at a selected temperature. Alternatively, the extrusion and orientation steps may be performed simultaneously. In the case of polarizers, the film is stretched substantially in one direction (uniaxial orientation), while in the case of mirror films, the film is stretched substantially in two directions (biaxial orientation), which may be performed simultaneously or sequentially.

In different processing embodiments, the multilayer film may be allowed to dimensionally relax in a cross-stretch direction, resulting in a natural reduction in cross-stretch (equal to the square root of the stretch ratio); the multilayer film may be constrained to limit any substantial change in cross-stretch dimension; or the multilayer film may be actively stretched in a cross-stretch dimension. For example, the multilayer film may be stretched in the machine direction, as with a length orienter, or in width using a tenter.

The pre-stretch temperature, stretch temperature, stretch rate, stretch ratio, heat set temperature, heat set time, heat set relaxation, and cross-stretch relaxation are selected to yield a multilayer film having the desired refractive index relationship and physical dimensions. These variables are interdependent; thus, for example, a relatively low stretch rate could be used if coupled with, for example, a relatively low stretch temperature. In general, a stretch ratio in the range from about 1:2 to about 1:10 (more preferably about 1:3 to about 1:7) in the stretch direction and from about 1:0.2 to about 1:10 (more preferably from about 1:0.5 to about 1:7) orthogonal to the stretch direction is selected in an exemplary embodiment.

Suitable multilayer films may also be prepared using techniques such as spin coating (e.g., as described in Boese et al., J. Polym. Sci.: Part B, 30:1321 (1992) for birefringent polyimides) and vacuum deposition (e.g., as described by Zang et. al., Appl. Phys. Letters, 59:823 (1991) for crystalline organic compounds); the latter technique is particularly useful for certain combinations of crystalline organic compounds and inorganic materials.

Test Methods

Differential Scanning Calorimetry (DSC):

The materials were tested using DSC (Q2000 commercially available from TA Instruments, New Castle, Del.). A sample of about 5-10 mg was used for each composition. The test involved a 3 stage heating-cooling-heating temperature ramp at a temperature range of 30-290° C. The sample was held at 290° C. for 3 min after the first heat. The ramp rate was 20° C./min for both heating and cooling. Both the first heating scan and the second heating scan were analyzed.

Refractive Index (RI) Measurement:

The refractive indices of the various samples were measured using a Metricon Prism coupler (Metricon Corporation, Pennington, N.J.) in the MD, TD, and TM directions. MD and TD are in-plane directions and TM is normal to the film surface. The refractive indices of MD, TD and TM are labeled as: $n_x$, $n_y$, and $n_z$, respectively.

In-Plane Birefringence, $\Delta n_{in}$:

In order to measure the birefringent nature of a uniaxially stretched film, in-plane birefringence is used.

In-plane birefringence concerns the difference of the indices ($n_x$ and $n_y$) in the orthogonal in-plane directions. More specifically for a uniaxially stretched film, in-plane birefringence refers to the difference between the stretching direction and the non-stretching direction. For example, assuming a film is uniaxially stretched in MD direction, the in-plane birefringence is expressed as following.

$$\Delta n_{in} = n_x - n_y$$

Where $n_x$ is the refractive index in the stretching direction (in this case, MD), and $n_y$ is the non-stretching direction (in this case, TD).

For a biaxially stretching film, the in-plane birefringence is relatively small and sometimes close to zero if balanced. Instead, out-of-plane birefringence is more indicative of the birefringent nature of the stretched film.

Out-of-Plane Birefringence, $\Delta n_{out}$:

In order to measure the birefringent nature of a biaxially oriented film, out-of-plane birefringence is used.

Out-of-plane birefringence concerns the difference between average of in-plane indices (MD and TD) and the index normal to the film (TM). Out-of-plane birefringence can be expressed as following:

$$\Delta n_{out} = \frac{(n_x + n_y)}{2} - n_z$$

Where $n_x$ is RI in MD and $n_y$ is RI in TD and $n_z$ is RI in TM.

Out-of-plane birefringence can also be used to measure the birefringent nature of uniaxially stretched films. Results are summarized in Tables 5-7.

Thermal Stability:

The thermal degradation was measured by monitoring viscosity drop as a function of time at a temperature above melt. This was achieved by a time-sweep scan using a rheometer (ARES commercially available from TA Instruments, New Castle, Del.). The temperatures were 250° C. and 280° C., respectively. The (oscillating mode) shear rate at which the viscosity was measured was $100s^{-1}$. The materials were vacuum dried at 70° C. for 48 hrs before testing. Nitrogen was used to purge the test apparatus to displace all oxygen.

NMR to Determine Chemical Composition

Samples from the materials were dissolved in a 1:1 mixture of deuterated chloroform and trifluoroacetic acid. 1D NMR spectra were collected on a 500 MHz instrument equipped with a dual channel Varian Chili probe. Integrated monomer compositions are extracted based on known specific chemical shifts and the peak area. Integrations were carried out after phasing and baseline correction.

Monomer Abbreviation—Generic Chemical Description—Supplier (Location)

NDC—naphthalene dicarboxylic acid—BP Amoco (Naperville, Ill.)

DMT—dimethyl terephthalate—Invista (Wichita, Kans.)

DMSSIP—dimethyl sulfosodium isophthalate (ionomer)—DuPont (Wilmington, Del.)

EG—ethylene glycol—ME Global (Midland, Mich.)

NPG—neopentyl glycol—Eastman (Kingsport, Tenn.)

CHDM—cyclohexane dimethanol—Eastman (Kingsport, Tenn.)

Catalysts & Stabilizer

TEPA—Triethylphosphonoacetate—Rhodia (Cranbury, N.J.)

NaOAc—sodium acetate—Alfa Aesar (Ward Hill, Mass.)

Co(OAc)2—cobalt acetate—Shepherd Chemical (Cincinnati, Ohio)

Zn(OAc)2—zinc acetate—Mallinckrodt Baker (Phillipsburg, N.J.)

Sb(OAc)3—antimony triacetate—Arkema (Philadelphia, Pa.)

Synthesis of Birefringent Copolymer Materials:

All copolymers in the examples were synthesized according to the following procedure:

For each composition, a stainless steel, oil jacketed batch reactor was charged with the amount of monomers indicated in Table 1 and the following catalysts: 2 g of Co(OAc)$_2$, 1.6 g of Zn(OAc)$_2$, 8.9 g of Sb(Oac)$_3$, and 3.6 g of triethyl phosphonoacetate (TEPA). Under pressure (239.2 kPa), the mixture was heated to 257° C. with removal of 7-8 kg of the esterification reaction by-product, methanol. After the methanol was completely removed, 3.6 g of TEPA was charged to the reactor and the pressure was then gradually reduced to below 500 Pa while heating to 277° C. The condensation reaction by-product, ethylene glycol, was continuously removed until a resin having an intrinsic viscosity of about 0.50 dL/g, as measured in 60/40 wt. % phenol/o-dichlorobenzene at 30° C., was produced.

TABLE 1

Monomer Concentrations Employed in the Synthesis of the Copolyesters

| Ex. # | Polymer | NDC lb | DMT lb | DMSSIP lb | EG lb | NPG lb | CHDM lb |
|---|---|---|---|---|---|---|---|
| Control A | PEN | 39.4 | 0 | 0 | 23 | 0 | 0 |
| Control B | 90/10 coPEN | 36.5 | 3.2 | 0 | 22.7 | 0 | 0 |
| 1 | PEN-NPG5 | 39.6 | 0 | 0 | 21.6 | 0.84 | 0 |
| 2 | PEN-NPG10 | 39.3 | 0 | 0 | 21 | 1.68 | 0 |
| 3 | PEN-NPG15 | 39.1 | 0 | 0 | 20.4 | 2.5 | 0 |

TABLE 1-continued

Monomer Concentrations Employed in the Synthesis of the Copolyesters

| Ex. # | Polymer | NDC lb | DMT lb | DMSSIP lb | EG lb | NPG lb | CHDM lb |
|---|---|---|---|---|---|---|---|
| 4 | PEN-NPG10i.25 | 39.2 | 0 | 0.119 | 21 | 1.68 | 0 |
| 5 | PEN-CHDM2.5 | 39.1 | 0 | 0 | 21.8 | 0 | 0.58 |
| 6 | PEN-CHDM5 | 39.4 | 0 | 0 | 21.5 | 0 | 1.13 |
| 7 | PEN-CHDM10 | 38.9 | 0 | 0 | 20.8 | 0 | 2.23 |
| 8 | PEN-CHDM15 | 38.4 | 0 | 0 | 20 | 0 | 3.31 |
| 9 | PEN-CHDM5i.25 | 39.1 | 0 | 0.12 | 21.6 | 0 | 1.16 |
| 10 | PEN-CHDM10i.25 | 38.8 | 0 | 0.118 | 20.7 | 0 | 2.23 |
| 11 | 90/10 coPEN-CHDM10 | 36 | 3.18 | 0 | 21.6 | 0 | 2.36 |

TABLE 2a

Copolyester Compositions from $^1$H NMR Results - (overall mol %)

| Ex. # | Polymer | NDA mol % | TA mol % | EG mol % | NPG mol % | CHDM mol % | Ionomer SSIPA mol % | CH2-OH mol % | DEG mol % |
|---|---|---|---|---|---|---|---|---|---|
| Control A | PEN | 49.5% | 0% | 46.7% | 0% | 0% | 0% | 1.6% | 2.1% |
| Control B | 90/10 CoPEN | 44.5% | 5.2% | 47.8% | 0% | 0% | 0% | 1.3% | 1.2% |
| 1 | PEN-NPG5 | 49.6% | 0% | 46.1% | 1.8% | 0% | 0% | 1.6% | 0.9% |
| 2 | PEN-NPG10 | 49.6% | 0% | 44.5% | 3.5% | 0% | 0% | 1.6% | 0.9% |
| 3 | PEN-NPG15 | 49.6% | 0% | 42.8% | 5.0% | 0% | 0% | 1.6% | 0.9% |
| 4 | PEN-NPG10i.25 | 49.7% | 0% | 41.1% | 3.2% | 0% | 0.1% | 1.4% | 4.4% |
| 5 | PEN-CHDM2.5 | 49.6% | 0% | 45.6% | 0% | 1.2% | 0% | 1.6% | 2.0% |
| 6 | PEN-CHDM5 | 49.5% | 0% | 45.6% | 0% | 2.2% | 0% | 1.9% | 0.8% |
| 7 | PEN-CHDM10 | 49.4% | 0% | 43.3% | 0% | 4.4% | 0% | 1.9% | 1.0% |
| 8 | PEN-CHDM15 | 49.6% | 0% | 41.3% | 0% | 6.8% | 0% | 1.4% | 0.9% |
| 9 | PEN-CHDM5i.25 | 49.5% | 0% | 40.3% | 0% | 2.0% | 0.1% | 2.8% | 5.4% |
| 10 | PEN-CHDM10i.25 | 49.7% | 0% | 43.3% | 0% | 4.2% | 0.3% | 1.6% | 0.9% |
| 11 | 90/10 CoPEN-CHDM10 | 44.1% | 5.6% | 42.7% | 0% | 4.8% | 5.6% | 1.6% | 1.2% |

TABLE 2b

Copolyester Compositions from $^1$H NMR Results - (mol % diacid & diol)

| Ex. # | Polymer | NDA mol % | TA mol % | EG mol % | NPG mol % | CHDM mol % | Ionomer SSIPA mol % | CH2-OH mol % | DEG mol % |
|---|---|---|---|---|---|---|---|---|---|
| Control A | PEN | 99.1% | 0% | 93.4% | 0% | 0% | 0% | 3.3% | 4.2% |
| Control B | 90/10 CoPEN | 89.5% | 10.4% | 95.6% | 0% | 0% | 0% | 2.6% | 2.4% |
| 1 | PEN-NPG5 | 99.3% | 0% | 92.2% | 3.6% | 0% | 0% | 3.2% | 1.8% |
| 2 | PEN-NPG10 | 99.2% | 0% | 88.9% | 7.0% | 0% | 0% | 3.1% | 1.8% |
| 3 | PEN-NPG15 | 99.3% | 0% | 85.7% | 10% | 0% | 0% | 3.2% | 1.9% |
| 4 | PEN-NPG10i.25 | 99.4% | 0% | 82.2% | 6.5% | 0% | 0.2% | 2.9% | 8.8% |
| 5 | PEN-CHDM2.5 | 99.3% | 0% | 91.2% | 0% | 2.4% | 0% | 3.1% | 4.0% |
| 6 | PEN-CHDM5 | 99.0% | 0% | 91.1% | 0% | 4.5% | 0% | 3.7% | 1.7% |
| 7 | PEN-CHDM10 | 98.8% | 0% | 86.6% | 0% | 8.8% | 0% | 3.7% | 2.0% |
| 8 | PEN-CHDM15 | 99.2% | 0% | 82.6% | 0% | 13.6% | 0% | 2.8% | 1.9% |
| 9 | PEN-CHDM5i.25 | 99.1% | 0% | 80.6% | 0% | 4.0% | 0.1% | 5.5% | 10.7% |
| 10 | PEN-CHDM10i.25 | 99.5% | 0% | 86.6% | 0% | 8.4% | 0.6% | 3.3% | 1.7% |
| 11 | 90/10 CoPEN-CHDM10 | 88.2% | 11.2% | 85.4% | 0% | 9.6% | 11.2% | 3.3% | 2.4% |

TABLE 3

Refractive Index and DSC Properties of Copolyester

| Ex. | Label | RI | I.V. (dl/g) | 1st Scan (DSC) Heating&Cooling | | | | 2nd Scan (DSC) Heating | | | |
|---|---|---|---|---|---|---|---|---|---|---|---|
| | | | | Tm (° C.) | Tc (° C.) | ΔHm (J/g) | Tg (° C.) | Tm (° C.) | Tc (° C.) | ΔHm (J/g) |
| Control A | PEN | 1.640 | 0.48 | 270 | | 42.0 | 118 | 270 | 224 | 8.5 |
| Control B | 90/10 CoPEN | 1.629 | 0.48 | 224 | | 37.2 | 109 | No Tm | No Tc | <1 |

TABLE 3-continued

Refractive Index and DSC Properties of Copolyester

| Ex. | Label | RI | I.V. (dl/g) | 1st Scan (DSC) Heating&Cooling | | | | Second Scan (DSC) Heating | | | |
|---|---|---|---|---|---|---|---|---|---|---|---|
| | | | | Tm (°C.) | Tc (°C.) | ΔHm (J/g) | Tg (°C.) | Tm (°C.) | Tc (°C.) | ΔHm (J/g) | |
| 1 | PEN-NPG5 | 1.640 | 0.42 | 259 | 159 | 52.7 | 119 | 257 | 214 | 5.0 | |
| 2 | PEN-NPG10 | 1.637 | 0.43 | 247 | 140 | 45.4 | 118 | No Tm | No Tc | <1 | |
| 3 | PEN-NPG15 | 1.636 | 0.43 | 239 | 177 | 38.1 | 117 | No Tm | No Tc | <1 | |
| 4 | PEN-NPG10i.25 | 1.636 | 0.42 | 232 | 129 | — | 111 | No Tm | No Tc | <1 | |
| 5 | PEN-CHDM2.5 | 1.639 | 0.44 | 258 | 170 | 52.5 | 118 | 247 | 219 | 4.1 | |
| 6 | PEN-CHDM5 | 1.639 | 0.46 | 257 | 148 | 52.5 | 119 | 255 | 222 | 5.5 | |
| 7 | PEN-CHDM10 | 1.637 | 0.43 | 245 | 137 | 48.5 | 117 | No Tm | No Tc | <1 | |
| 8 | PEN-CHDM15 | 1.636 | 0.45 | 236 | 140 | 42.2 | 118 | No Tm | No Tc | <1 | |
| 9 | PEN-CHDM5i.25 | 1.635 | 0.47 | 227 | 128 | 36.2 | 107 | No Tm | No Tc | <1 | |
| 10 | PEN-CHDM10i.25 | 1.637 | 0.44 | 247 | 146 | 48.7 | 118 | No Tm | No Tc | <1 | |
| 11 | 90/10 CoPEN-CHDM10 | 1.631 | 0.44 | 226 | 133 | 39.1 | 113 | No Tm | No Tc | <1 | |

TABLE 4

Thermal Stability of the Copolyesters

| Ex. | Material | Viscosity Change at 100 s⁻¹ (250° C./1 hr/N₂) (%) | Viscosity Change at 100 s⁻¹ (280° C./1 hr/N₂) (%) |
|---|---|---|---|
| Control A | PEN | 2113.7 | −0.9 |
| Control B | 90/10 coPEN | 6.8 | 3.0 |
| Control C | SA115 | −13.1 | −66.3 |
| Control D | PETG6763 | −6.4 | −52.0 |
| 1 | PEN-NPG5 | 2.8 | 9.4 |
| 2 | PEN-NPG10 | 5.1 | 9.3 |
| 3 | PEN-NPG15 | 5.9 | 6.3 |
| 4 | PEN-NPG10i.25 | 6.0 | −0.8 |
| 5 | PEN-CHDM2.5 | 393.6 | 4.5 |
| 6 | PEN-CHDM5 | 9.0 | 6.6 |
| 7 | PEN-CHDM10 | 5.9 | 2.4 |
| 8 | PEN-CHDM15 | 10.5 | −2.4 |
| 9 | PEN-CHDM5i.25 | 5.9 | 0.3 |
| 10 | PEN-CHDM10i.25 | 4.9 | 1.3 |
| 11 | 90/10 coPEN-CHDM10 | 5.3 | 1.2 |

Procedure for the Production of the Multilayer Films:

3-layer coextruded films of Examples 12-34 were made using following procedures:

Coextruded films containing 3 layers were made on a pilot extrusion line using a 3-layer ABA (skin/core/skin) feedblock. The Layer-A polymer was polypropylene commercially available from Exxon under the grade name of Escorene PP1024, and was fed by a single screw extruder to the skin channel of the feedblock. The Layer-B polymer was birefringent copolyester of each example, and was fed by a twin screw extruder to the core channel of the feedblock. The feed ratio for skin/core/skin was 1:1:1 by volume. The total extrusion rate was 30 lbs per hour. The extrudate was cast with a film die onto a chill roll to make cast web. Specimens of the cast web were then stretched in a KARO IV batch stretching machine (Bruckner Maschinengebau, Siegsdorff, Germany). The stretching conditions are listed for each film sample in the tables.

In order to evaluate the birefringence of the copolyesters, the polypropylene skin layers are peeled off after stretching to expose the core birefringent layer. The refractive indices for the core layer is tested a Metricon Prism coupler (Metricon Corporation, Pennington, N.J.) in the MD, TD, and TM directions. In-plane and out-of-plane birefringence were calculated based on the equations outlined in the testing methods section.

TABLE 5

Out-of-plane Birefringence of Biaxially Stretched Copolyesters in a 3-Layer Mirror Film

| Ex. | Material | Draw Temp °C. | Draw Ratio MD | Draw Ratio TD | DR %/(sec) | Preheat Time (sec) | nx | Ny | nz | Out-of-plane Birefringence |
|---|---|---|---|---|---|---|---|---|---|---|
| Control | PEN | 130 | 3.5 | 3.5 | 100 | 50 | 1.7290 | 1.7420 | 1.5090 | 0.227 |
| Control | 90/10 coPEN | 130 | 3.5 | 3.5 | 100 | 50 | 1.7210 | 1.7030 | 1.5280 | 0.184 |
| 12 | PEN-NPG5 | 130 | 4 | 4 | 100 | 50 | 1.7140 | 1.6990 | 1.5410 | 0.166 |
| 13 | PEN-NPG10 | 130 | 4 | 4 | 100 | 50 | 1.6970 | 1.7250 | 1.5350 | 0.176 |
| 14 | PEN-NPG15 | 130 | 4 | 4 | 100 | 50 | 1.6780 | 1.7060 | 1.5550 | 0.137 |
| 15 | PEN-NPG10i.25 | 130 | 4 | 4 | 100 | 50 | 1.6860 | 1.7110 | 1.5470 | 0.152 |

TABLE 5-continued

Out-of-plane Birefringence of Biaxially Stretched Copolyesters in a 3-Layer Mirror Film

| Ex. | Material | Draw Temp °C. | Draw Ratio MD | Draw Ratio TD | DR %/(sec) | Pre-heat Time (sec) | nx | Ny | nz | Out-of-plane Birefringence |
|-----|----------|---------------|---------------|---------------|------------|---------------------|--------|--------|--------|---------------------------|
| 16 | PEN-CHDM2.5 | 130 | 4 | 4 | 100 | | 1.7050 | 1.7280 | 1.5280 | 0.189 |
| 17 | PEN-CHDM5 | 130 | 3.5 | 3.5 | 100 | 100 | 1.7392 | 1.7378 | 1.5026 | 0.236 |
| 18 | PEN-CHDM10 | 135 | 4.5 | 4.5 | 50 | 50 | 1.7306 | 1.7325 | 1.5064 | 0.225 |
| 19 | PEN-CHDM15 | 135 | 3.5 | 3.5 | 50 | 50 | 1.7333 | 1.7111 | 1.5214 | 0.201 |
| 20 | PEN-CHDM5i.25 | 130 | 4 | 4 | 100 | 50 | 1.6900 | 1.7140 | 1.5370 | 0.165 |
| 21 | PEN-CHDM10i.25 | 130 | 4 | 4 | 100 | 50 | 1.7046 | 1.7193 | 1.5312 | 0.181 |
| 22 | 90/10 coPEN-CHDM10 | 130 | 4 | 4 | 100 | 50 | 1.6460 | 1.7620 | 1.5260 | 0.178 |

TABLE 6

Constrained Uniaxially Stretched Film Birefringence of the Copolyesters
(Draw Ratio MD = 1, Draw Ratio TD = 6, Draw Rate = 100%/sec, Pre-heat Time 50 sec)

| Example ID | Material | Draw Temp Range °C. | nx | ny | nz | In-Plane Birefringence | Out-of-Plane Birefringence |
|------------|----------|---------------------|--------|--------|--------|------------------------|----------------------------|
| Control | PEN | 125-150 | 1.8426 | 1.6139 | 1.5247 | 0.229 | 0.204 |
| Control | 90/10 coPEN | 125-150 | 1.8180 | 1.6097 | 1.5329 | 0.208 | 0.181 |
| 22 | PEN-NPG5 | 125-150 | 1.8037 | 1.6045 | 1.5497 | 0.199 | 0.154 |
| 23 | PEN-NPG10 | 125-150 | 1.8204 | 1.6104 | 1.5376 | 0.210 | 0.178 |
| 24 | PEN-NPG15 | 125-150 | 1.7698 | 1.6064 | 1.5704 | 0.163 | 0.118 |
| 25 | PEN-NPG10i.25 | 120-140 | 1.7468 | 1.6077 | 1.5821 | 0.139 | 0.095 |
| 26 | PEN-CHDM2.5 | 125-140 | 1.8265 | 1.6069 | 1.5379 | 0.220 | 0.179 |
| 27 | PEN-CHDM5 | 125-150 | 1.8345 | 1.6070 | 1.5290 | 0.227 | 0.192 |
| 28 | PEN-CHDM10 | 125-150 | 1.8241 | 1.5989 | 1.5391 | 0.225 | 0.172 |
| 29 | PEN-CHDM15 | 125-150 | 1.8367 | 1.5840 | 1.5395 | 0.252 | 0.171 |
| 30 | PEN-CHDM5i.25 | 125-150 | 1.7932 | 1.5980 | 1.5587 | 0.195 | 0.137 |
| 31 | PEN-CHDM10i.25 | 125-150 | 1.8271 | 1.5993 | 1.5371 | 0.228 | 0.176 |
| 32 | coPEN-CHDM10 | 125-150 | 1.8134 | 1.5914 | 1.5413 | 0.222 | 0.161 |

TABLE 7

Unconstrained Uniaxially Stretched Film Birefringence of the Copolyesters
(Draw Ratio MD = 0.5, Draw Ratio TD = 6, Draw Rate = 150%/sec, Pre-heat Time 5 sec)

| Example ID | Material | Draw Temp Range °C. | nx | ny | nz | In-Plane Birefringence | Out-of-Plane Birefringence |
|------------|----------|---------------------|--------|--------|--------|------------------------|----------------------------|
| Control | PEN | 125-135 | 1.88 | 1.5615 | 1.5473 | 0.3185 | 0.1735 |
| Control | 90/10 coPEN | 125-150 | 1.8656 | 1.5609 | 1.5460 | 0.3047 | 0.1673 |
| 33 | PEN-NPG5 | 125-150 | 1.8719 | 1.5581 | 1.5574 | 0.3138 | 0.1576 |
| 34 | PEN-NPG10 | 125-150 | 1.8634 | 1.5594 | 1.5649 | 0.304 | 0.1465 |
| 35 | PEN-NPG15 | 125-150 | 1.8558 | 1.5744 | 1.5444 | 0.2814 | 0.1707 |
| 36 | PEN-NPG10i.25 | 120-140 | 1.8569 | 1.5653 | 1.5402 | 0.2916 | 0.1709 |
| 37 | PEN-CHDM2.5 | 120-140 | 1.8635 | 1.5692 | 1.5507 | 0.2943 | 0.1657 |
| 38 | PEN-CHDM5 | 125-150 | 1.8798 | 1.5561 | 1.5514 | 0.3237 | 0.1666 |
| 39 | PEN-CHDM10 | 125-150 | 1.8746 | 1.5502 | 1.5486 | 0.3244 | 0.1638 |
| 40 | PEN-CHDM15 | 125-150 | 1.8735 | 1.5531 | 1.5489 | 0.3204 | 0.1644 |
| 41 | PEN-CHDM5i.25 | 125-150 | 1.8338 | 1.5586 | 1.5491 | 0.2752 | 0.1471 |
| 42 | PEN-CHDM10i.25 | 125-150 | 1.8722 | 1.5554 | 1.5458 | 0.3168 | 0.168 |
| 43 | coPEN-CHDM10 | 125-150 | 1.8412 | 1.5601 | 1.5458 | 0.2811 | 0.1549 |

Isotropic coPEN 1 is a copolyester in which 55 mol % of the diacid moieties result from use of naphthalene dicarboxylic acid or its esters and 45 mol % of the diacid moieties result from use of terephthalic acid or its esters, and the diol moieties result from use of a mixture of diols which includes 1,6-hexanediol, in the polymerization reaction. Isotropic coPEN 1 was made as follows: A batch reactor was charged with 88.5 kg dimethyl 2,6-naphthalenedicarboxylate, 57.5 kg dimethyl terephthalate, 81 kg ethylene glycol, 4.7 kg 1,6-hexanediol, 239 g trimethylol propane, 22 g zinc(II) acetate, 15 g cobalt(II) acetate, and 51 g antimony(III) acetate. Under pressure of 20 psig, this mixture was heated to 254° C. with removal of the esterification reaction by-product, methanol. After 39.6 kg of methanol was removed, 37 g of triethyl phosphonoacetate was charged to the reactor and the pressure was then gradually reduced to 1 torr (131 N/m2) while heating to 290° C. The condensation reaction by-product, ethylene glycol, was continuously removed until a polymer with an intrinsic viscosity of 0.56 dL/g, as measured in 60/40 wt-% phenol/o-dichlorobenzene at 23° C., was produced. The copolyester polymer produced by this method had a glass transition temperature (Tg) of 94° C. as measured by differential scanning calorimetry at a temperature ramp rate of 20° C. per minute.

Isotropic coPEN2 is a copolyester in which 50 mol % of the diacid moieties result from use of naphthalene dicarboxylic acid or its esters and 50 mol % of the diacid moieties result from use of terephthalic acid or its esters, and the diol moieties result from use of a mixture of diols which includes 1,6-hexanediol, in the polymerization reaction. Isotropic coPEN2 can be made with the following raw material charge: dimethyl 2,6-naphthalenedicarboxylate (80.0 kg), dimethyl terephthalate (63.6 kg), 1,6-hexane diol (15.5 kg), ethylene glycol (85.0 kg), trimethylol propane (880 g), cobalt (II) acetate (29 g), zinc acetate (33 g), and antimony (III) acetate (59 g). The mixture was heated to a temperature of 254° C. at a pressure of 20 psig and the mixture allowed reacting while removing the methanol reaction product. After completing the reaction and removing the methanol (approximately 42 kg) the reaction vessel was charged with triethyl phosphonoacetate (56 g) and the pressure was reduced to one torr (131 N/m2) while heating to 290° C. The condensation by-product, ethylene glycol, was continuously removed until a polymer with intrinsic viscosity of about 0.5 dl/g as measured in a 60/40 weight percent mixture of phenol and o-dichlorobenzene was produced.

Isotropic coPEN3 is a melt blend of an amorphous polyester resin commercially available from Eastman Chemical Company under the trade designation "PETG 6763" and isotropic coPEN2 by feeding both resins into an extruder with a weight ratio of 25/75.

Isotropic coPEN4 is a melt blend of PETg 6763 and isotropic coPEN2 by feeding both resins into an extruder with a weight ratio of 37/63.

REFLECTIVE POLARIZER COMPARATIVE EXAMPLE (RPA)

Multilayer Optical Film Based on PEN

A reflective polarizer was created by coextruding PEN as the first birefringent layer and Isotropic coPEN 1 as the second layer in an alternating layer arrangement having about 900 total layers, then by stretching the film in the transverse direction in a standard tenter frame

REFLECTIVE POLARIZER COMPARATIVE EXAMPLE (RPB)

A reflective polarizer was created by coextruding 90/10 coPEN as the first birefringent layer and Isotropic coPEN3 as the second layer in an alternating layer arrangement having 275 total layers, then by stretching the film in the transverse direction in a standard tenter frame process at an average rate of approximately 100% per second, a draw ratio of approximately 6:1, and a temperature of 300° F.

RELECTIVE POLARIZER MULTILAYER EXAMPLE (RP1)

A reflective polarizer was created by coextruding PEN-CHDM10 as the first birefringent layer and Isotropic coPEN3 as the second layer in an alternating layer arrangement having 275 total layers, then by stretching the film in the transverse direction in a standard tenter frame process at an average rate of approximately 100% per second and a temperature of 285° F.

RELECTIVE POLARIZER MULTILAYER EXAMPLE (RP2)

A reflective polarizer was created by coextruding PEN-CHDM5 as the first birefringent layer and Isotropic coPEN4 as the second layer in an alternating layer arrangement having 275 total layers, then by stretching the film in the transverse direction in a standard tenter frame process at an average rate of approximately 100% per second, a draw ratio of approximately 6:1, and a temperature of 285° F.

The spectral characteristics the multilayer reflective polarizer film were measured and used to estimate the effective refractive indices of the birefringent ($n_{x1}$, $n_{y1}$, $n_{z1}$) and isotropic layers ($n_{x2}$, $n_{y2}$, $n_{z2}$) and the ratio of birefringen to off-axis index mismatch as defined by $(n_{x1}-n_{y1})/(n_{y1}-n_{z1})$ as reported in Table 8 as follows:

TABLE 8

Effective Refractive Indices and Ratio Birefringence to Off-axis Mismatch

| | | RPA | RPB | RP1 | RP2 |
|---|---|---|---|---|---|
| | | | Birefringent layer | | |
| | Refractive Index | PEN | 90/10 coPEN | PEN-CHDM10 | PEN-CHDM5 |
| Birefringent Layer | $n_{x1}$ | 1.850 | 1.835 | 1.851 | 1.857 |
| | $n_{y1}$ | 1.620 | 1.617 | 1.607 | 1.617 |
| | $n_{z1}$ | 1.500 | 1.534 | 1.528 | 1.535 |
| | $(n_{x1}-n_{y1})/(n_{y1}-n_{z1})$ | 1.9 | 2.6 | 3.1 | 2.9 |
| Isotropic Layer | $n_{x2}$ | 1.610 | 1.596 | 1.596 | 1.590 |
| | $n_{y2}$ | 1.610 | 1.596 | 1.596 | 1.590 |
| | $n_{z2}$ | 1.610 | 1.596 | 1.596 | 1.590 |
| | Material | Isotropic coPEN 1 | Isotropic coPEN 3 | Isotropic coPEN 3 | Isotropic coPEN 4 |

What is claimed is:

1. A multilayer optical film comprising:
   at least one first birefringent optical layer having an out-of-plane birefringence of at least 0.10 at 632.8 nm after the multilayer film is formed comprising a copolyester, wherein the copolyester comprises
   40 to 50 mol % naphthalate units,
   35 to 49 mol % ethylene units, and
   1 to 8 mol % of branched or cyclic C4-C10 alkyl units; and
   at least one second optical layer having a lower birefringence than the first optical layer.

2. The multilayer optical film of claim 1 wherein the copolyester comprises carboxylate subunits and glycol subunits and 80-100 mol % of the carboxylate subunits comprise the naphthalate subunits, 70 to 98 mol % of the glycol subunits are derived from ethylene glycol, and 2-16 mol % of the glycol subunits are derived from one or more branched or cyclic C4-C10 alkyl glycols.

3. The multilayer optical film of claim 1 wherein the first birefringent optical layer has an in-plane birefringence of at least 0.10 at 632.8 nm after the multilayer film is formed.

4. The multilayer optical film of claim 1 wherein the second optical layer has an in-plane birefringence of less than 0.040 at 632.8 nm after the multilayer film is formed.

5. The multilayer optical film of claim 1 wherein the first birefringent optical layer has an in-plane birefringence of at least 0.20 at 632.8 nm after the multilayer film is formed.

6. The multilayer optical film of claim 5 wherein the multilayer optical film is a polarizer.

7. The multilayer optical film of claim 1 wherein the first birefringent optical layer has an out-of-plane birefringence of at least 0.16 at 632.8 nm after the multilayer film is formed.

8. The multilayer optical film of claim 7 wherein the multilayer optical film is a mirror.

9. The multilayer optical film of claim 1 wherein the copolyester has a glass transition temperature of at least 105° C.

10. The multilayer optical film of claim 1 wherein the first optical layer has a ratio of birefringence to off-axis index mismatch as defined by $(n_{x1}-n_{y1})/(n_{y1}-n_{z1})$ of at least 2.5.

11. The multilayer optical film of claim 1 wherein the first optical layer has a ratio of birefringence to off-axis index mismatch as defined by $(n_{x1}-n_{y1})/(n_{y1}-n_{z1})$ of at least 2.7.

12. The multilayer optical film of claim 1 wherein the copolyester exhibits a second scan heat of fusion of less than 2 J/g according to differential scanning calorimetry when heated at a rate of 20° C. minutes.

13. The multilayer optical film of claim 1 wherein the copolyester is has a melting temperature ranging from 225° C. to 260° C.

14. The multilayer optical film of claim 1 wherein the copolyester comprises 2 to 4 mol % of branched C4-C10 alkyl units.

15. The multilayer optical film of claim 14 wherein the copolyester comprises 2 to 4 mol % of neopentyl glycol units.

16. The multilayer optical film of claim 1 wherein the copolyester comprises 2 to 8 mol % of cyclic C4-C10 alkyl units.

17. The multilayer optical film of claim 16 wherein the copolyester comprises 2 to 8 mol % of cyclohexane dimethanol units.

18. The multilayer optical film of claim 1 wherein the copolyester further comprises up to 8 mol % of terephthalate units.

19. The multilayer optical film of claim 1 wherein the copolyester further comprises up to 1.0 mol % of units of dimethyl sulfosodium isophthalate ionomer.

20. The multilayer optical film of claim 1 wherein the multilayer comprises a plurality a first optical layers alternating with a plurality of second optical layers.

21. The multilayer optical film of claim 1 wherein the combination of the at least one first optical layer and the at least one second optical layer exhibits a change in viscosity of less than 15% as measured at a shear rate of $100s^{-1}$ after 1 hour under nitrogen at a temperature of 250° C.

* * * * *

UNITED STATES PATENT AND TRADEMARK OFFICE
CERTIFICATE OF CORRECTION

PATENT NO.        : 8,012,571 B2
APPLICATION NO.   : 12/114109
DATED             : September 6, 2011
INVENTOR(S)       : Yufeng Liu It is certified that error appears in the above-identified patent and that said Letters Patent is hereby corrected as shown below:

Title Page, Col 2 (Abstract) item (57)
Line 8, Delete "isophthtalate" and insert -- isophthalate --, therefor.

Column 2
Line 15, Delete "birefrigent" and insert -- birefringent --, therefor.
Line 18, Delete "birefrigent" and insert -- birefringent --, therefor.
Line 61, Delete "isophthtalate" and insert -- isophthalate --, therefor.

Column 6
Line 42, After "copolyester)" insert -- . --.
Line 48, Delete "thereof," and insert -- thereof; --, therefor.

Column 7
Line 52, Delete "thereof," and insert -- thereof; --, therefor.
Line 54, Delete "thereof," and insert -- thereof; --, therefor.
Line 56, Delete "thereof," and insert -- thereof; --, therefor.
Line 57, Delete "thereof," and insert -- thereof; --, therefor.

Column 9
Line 49, Delete "substanial" and insert -- substantial --, therefor.

Column 10
Line 43, Delete "degration" and insert -- degradation --, therefor.

Column 11
Line 45, Delete "isophthalalte" and insert -- isophthalate --, therefor.

Column 13
Line 18, Delete "Chimmasorb" and insert -- Chimassorb --, therefor.

Signed and Sealed this
Eighth Day of November, 2011

David J. Kappos
*Director of the United States Patent and Trademark Office*

CERTIFICATE OF CORRECTION (continued)
U.S. Pat. No. 8,012,571 B2

Column 20
Line 41, Delete "Siegsdorff," and insert -- Siegsdorf, --, therefor.

Column 24
Line 26, Delete "birefringen" and insert -- birefringent --, therefor.

Column 26
Line 2, In Claim 13, delete "is has" and insert -- has --, therefor.
Line 22, In Claim 20, delete "plurality a" and insert -- plurality of a --, therefor.